(12) United States Patent
McWaid et al.

(10) Patent No.: US 6,520,005 B2
(45) Date of Patent: *Feb. 18, 2003

(54) SYSTEM FOR SENSING A SAMPLE

(75) Inventors: Thomas McWaid, Fremont, CA (US); Peter Panagas, Santa Clara, CA (US); Steven G. Eaton, Sunnyvale, CA (US); Amin Samsavar, San Jose, CA (US); William R. Wheeler, Saratoga, CA (US)

(73) Assignee: KLA-Tencor Corporation, San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/313,962

(22) Filed: May 18, 1999

(65) Prior Publication Data

US 2002/0174714 A1 Nov. 28, 2002

Related U.S. Application Data

(63) Continuation-in-part of application No. 08/730,641, filed on Oct. 11, 1996, now Pat. No. 5,948,972, which is a continuation-in-part of application No. 08/598,848, filed on Feb. 9, 1996, now abandoned, which is a continuation-in-part of application No. 08/362,818, filed on Dec. 22, 1994, now Pat. No. 5,705,741.

(51) Int. Cl.[7] ............................. G01B 5/28; G01B 7/34; G01N 13/16
(52) U.S. Cl. ....................................................... 73/105
(58) Field of Search ........................... 73/105; 250/306, 250/307

(56) References Cited

U.S. PATENT DOCUMENTS 2,691,887 A 10/1954 Rinker
2,728,222 A 12/1955 Becker et al.

(List continued on next page.)

FOREIGN PATENT DOCUMENTS

EP 0361932 4/1990
EP 0536827 4/1993

(List continued on next page.)

OTHER PUBLICATIONS

Dai et al., "Nanotubes as Nanoprobes in Scaning Probe Microscopy", nature, vol. 384, pp. 147–151.*
Keller, "A Nanotube Molecular Tool", Nature, vol. 384, Nov. 14, 1996, p. 111.*

(List continued on next page.)

Primary Examiner—Daniel S. Larkin
(74) Attorney, Agent, or Firm—Skjerven Morrill, LLP; James S. Hsue

(57) ABSTRACT

A profiler or scanning probe microscope may be scanned across a sample surface with a distance between them controlled to allow the sensing tip to contact the surface intermittently in order to find and measure features of interest. The distance is controlled so that when the sensing tip is raised or lowered to touch the sample surface, there is no lateral relative motion between the tip and the sample. This prevents tip damage. Prior knowledge of the height distribution of the sample surface may be provided or measured and used for positioning the sensing tip initially or in controlling the separation to avoid lateral contact between the tip and the sample. The process may also be performed in two parts: a fast find mode to find the features and a subsequent measurement mode to measure the features. A quick step mode may also be performed by choosing steps of lateral relative motion to be smaller than 100 nanometers to reduce probability of tip damage. In this mode, after each vertical step to increase the separation between the tip and the sample, it is detected as to whether the tip and the sample are in contact. If they are still in contact after the vertical step, one or more vertical steps are taken to increase the separation, and no vertical step to reduce the separation is taken and no lateral relative motion is caused until it is determined that the tip and the sample are no longer in contact.

76 Claims, 6 Drawing Sheets

U.S. PATENT DOCUMENTS

| | | | |
|---|---|---|---|
| 3,283,568 A | | 11/1966 | Reason |
| 4,103,542 A | | 8/1978 | Wheeler et al. |
| 4,391,044 A | | 7/1983 | Wheeler |
| 4,441,177 A | | 4/1984 | Groh et al. |
| 4,574,625 A | | 3/1986 | Olasz et al. |
| 4,641,773 A | | 2/1987 | Morino et al. |
| 4,669,300 A | | 6/1987 | Hall et al. |
| 4,724,318 A | | 2/1988 | Binning |
| 4,883,959 A | | 11/1989 | Hosoki et al. |
| 4,902,892 A | * | 2/1990 | Okayama et al. ........... 250/307 |
| RE33,387 E | | 10/1990 | Binnig |
| 5,146,690 A | | 9/1992 | Breitmeier |
| 5,162,653 A | * | 11/1992 | Hosaka et al. .............. 250/306 |
| RE34,331 E | | 8/1993 | Elings et al. |
| 5,253,106 A | | 10/1993 | Hazard |
| 5,266,801 A | | 11/1993 | Elings et al. ............... 250/306 |
| 5,307,693 A | | 5/1994 | Griffith et al. |
| 5,308,974 A | | 5/1994 | Elings et al. |
| 5,309,755 A | | 5/1994 | Wheeler |
| 5,347,854 A | | 9/1994 | Martin et al. |
| 5,406,832 A | | 4/1995 | Gamble et al. |
| 5,412,980 A | | 5/1995 | Elings et al. |
| 5,414,690 A | | 5/1995 | Shido et al. |
| 5,415,027 A | | 5/1995 | Elings et al. ................. 73/105 |
| 5,426,302 A | | 6/1995 | Marchman et al. |
| 5,481,521 A | | 1/1996 | Washizawa et al. |
| 5,488,862 A | | 2/1996 | Neukermans et al. |
| 5,497,656 A | | 3/1996 | Kado et al. ................... 73/105 |
| 5,509,300 A | | 4/1996 | Chamberlin et al. |
| 5,513,168 A | | 4/1996 | Fujihara et al. |
| 5,614,712 A | * | 3/1997 | Ray ............................. 73/105 |
| 5,627,365 A | | 5/1997 | Chiba et al. |
| 5,629,790 A | | 5/1997 | Nuekermans et al. |
| 5,705,741 A | | 1/1998 | Eaton et al. |
| 5,866,806 A | | 2/1999 | Samsavar et al. ............. 73/105 |
| 6,028,305 A | * | 2/2000 | Minne et al. ........... 250/306 X |

FOREIGN PATENT DOCUMENTS

| | | | | |
|---|---|---|---|---|
| EP | 0594362 | | 4/1994 | |
| EP | 0633450 | | 1/1995 | |
| GB | 2009409 | | 6/1979 | .................. 73/105 |
| JP | 2-249910 | | 10/1990 | |
| WO | WO 04047 | | 6/1988 | |
| WO | 9408204 | | 4/1994 | |
| WO | 25888 | | 11/1994 | |
| WO | 05920 | * | 2/1998 | .................. 73/105 |

OTHER PUBLICATIONS

Nagy et al., "Carbon Nanotube Tipped Atomic Force Microscopy for Measurement of <100 nm Etch Morphology on Semiconductors", Applied Physics Letters, vol. 73, No. 04, Jul. 27, 1998. pp. 529–531.*
Wong et al., "Carbon Nanotube Tips: High–Resolution Probes for Imaging Biological Systems", J. Am. Chem. Soc., vol. 120, 1998, pp. 603–604.*
Written Opinion dated Mar. 29, 2001.
International Search Report dated Aug. 30, 2000.
"Single–Tube Three–Dimensional Scanner for Scanning Tunneling Microscopy," G. Binnig et al., *Review of Scientific Instruments*, vol. 57, No. 8, Aug. 1986, pp. 1688–1689.
"Magnetic Force Microscopy (MFM)," P. Grütter et al., Springer Series in Surface Sciences, *Scanning Tunneling Microscopy II*, vol. 28, Springer–Verlag Berlin Heidelberg 1992, pp. 152–207.
"A Stand–Alone Scanning Force and Friction Microscope," M. Hipp et al., *Ultramicroscopy*, 42–44 (1992), Elsevier Science Publishers B.V., pp. 1498–1503.
"New Scanning Device for Scanning Tunneling Microscope Applications," R. Koops et al., *Review of Scientific Instruments*, vol. 63, No. 8, Aug. 1992, pp. 4008–4009.
"Scanning Tunneling Microscopy," G. Binnig et al., *Helvetica Physica Acts*, vol. 55, 1982, pp. 726–735.
"Two–Scanning Tunneling Microscope Devices for Large Samples," G.B. Picotto et al., *Review of Scientific Instruments*, vol. 64, No. 9, Sep. 1993, p. 2699–2701.
"A High Precision Micropositioner Based on Magnetostriction Principle," W. Wang et al., *Review of Scientific Instruments*, vol. 63, No. 1, Jam. 1992, pp. 249–254.
"Design and Assessment of Monolithic High Precision Translation Mechanisms," S.T. Smith et al., *Journal of Physics E: Scientific Instruments*, vol. 20, Aug. 1987, pp. 977–983.
"Novel Optical Approach to Atomic Force Microscopy," G. Meyer et al., *Applied Physics Letters*, vol. 53, No. 12, Sep. 1988, pp. 1045–1047.
"Long Range Constant Force Profiling for Measurement of Engineering Surfaces," L.P. Howard, *Review of Scientific Instruments*, vol. 63, No. 10, Oct. 1992, pp. 4289–4295.
"The National Institute of Standards and Technology Molecular Measuring Machine Project: Metrology and Precision Engineering Design," E.C. Teague, *J. Vac. Sci. Technol. B*, vol. 7, No. 6, Nov./Dec. 1989, pp. 1898–1902.
"Evaluating the Sensitivity of a Fiber–Optic Displacement Sensor," W.C. Oliver, Nano Instruments, Inc., *Technotes*.
To Measure a Molecule, F. Flam, pp. 21–24.
"The National Institute of Standards and Technology Molecular Measuring Machine: A Long–Range Scanning Tunneling Microscope for Dimensional Metrology," E.C. Teague, *Microbeam Analysis*, 1989, pp. 545–547.
"Products for Micropositioning ," Product Information Brochure published by Physik Instrumente (PI) GmbH & Co.
"Fiber Optic Proximity Sensors," Product Information Brochure published by Phone–Or, Ltd., Fiber Optic Sensors of Ashkelong ISRAEL.
"Series 88 Fiber–Optic Displacement Sensors," G.J. Philips, *Sensors*, Feb. 1995.
"Nanometrology," E.C. Teague, Proceedings of Scanned Probe Microscopy: STM and Beyond, an Engineering Foundation Conference, Santa Barbara, CA, Jan. 1991.
"Microlever with combined integrated sensor/actuator functions for scanning force microscopy," J. Brugger et al., *Sensors and Actuators A*, 43, 1994, pp. 339–345.
"Rocking–beam force–balance approach to atomic force microscopy," D.A. Grigg et al., *Ultramicroscopy*, 42–44, 1992, pp. 1504–1508.
"Scanning force microscope springs optimized for optical-beam deflections and with tips made by controlled feature," M.G.L. Gustafsson et al., *J. Appl. Phys.*, 76(1), Jul. 1, 1994, pp. 172–181.
"Micromachined AFM transducer with differential capacitive read–out," J. Bay et al., *J. Micromech. Microeng.*, vol. 5, 1995, pp. 161–165.
"Dimensional metrology with scanning probe microscopes," J. Griffith et al., *J. Appl. Phys.*, vol. 74, No. 9, Nov. 1, 1993, pp. R83–R109.
"A rocking beam electrostatic balance for the measurement of small forces," G. L. Miller et al., *Rev. Sci. Instrum.*, vol. 62, No. 3, Mar. 1991, pp. 705–709.
"Resonant silicon sensors," G.Stemme, *J. Micromech. Microeng.*, vol. 1, 1991, pp. 113–125.

"A New Force Sensor Incorporating Force–Feedback Control for Interfacial Force Microscopy," S. Joyce et al., *Rev. Sci. Instrum,* vol. 62, No. 3, Mar. 1991, pp. 710–715.

"From Molecules to Cells: Imaging Soft Samples with the Atomic Force Microscope," M. Radmacher et al., *Science,* vol. 257, Sep. 25, 1992, pp. 1900–1905.

"Dimensional Metrology of Phase–Shifting Masks with Scanning Probe Microscopes," J.E. Griffith et al., *SPIE,* Photomask Technology and Management, vol 2087, 1993, pp. 107–118.

"Silicon Wafer Thermal Processing: 300 mm Issues," H. Huff et al., *Future Fab International*, 1996, pp. 35–49.

"Atomic force microscopy for high speed imaging using cantilevers with and integated actuator and sensor," S.R. Manalis et al., *Appl. Phys. Lett.,* 68(6), Feb. 5, 1996, pp. 871–873.

"Thermal Imaging of Electronic Materials and Devices Using the Atomic Force Microscope," A. Majumdar et al, Proceedings of the SPIE—The International Society for Optical Engineering, 1993, Abstract only.

* cited by examiner

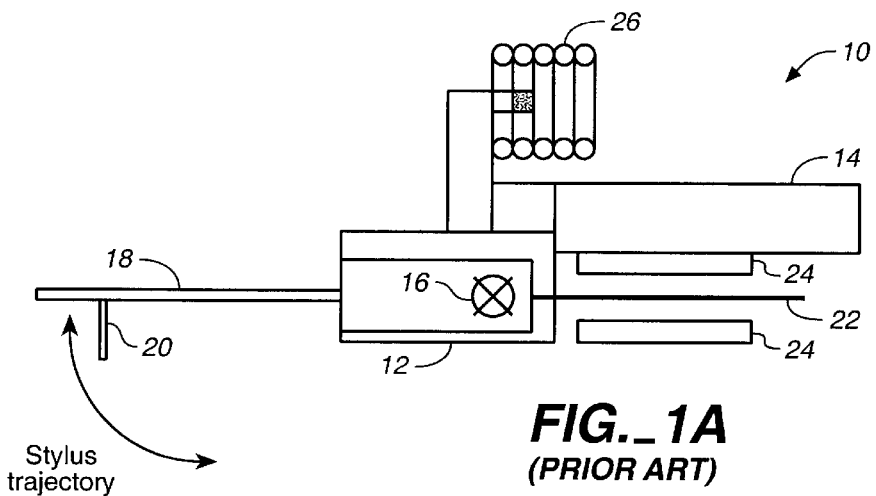
FIG._1A
(PRIOR ART)
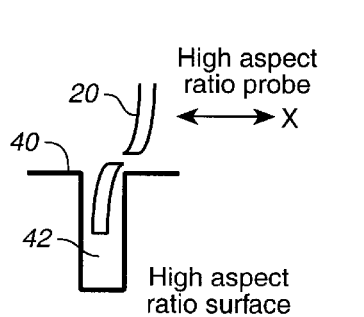
FIG._1B
(PRIOR ART)
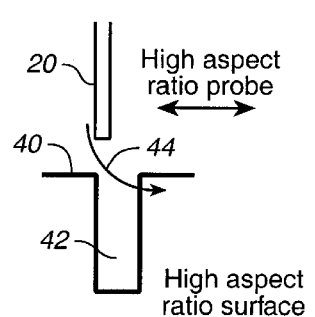
FIG._1C
(PRIOR ART)
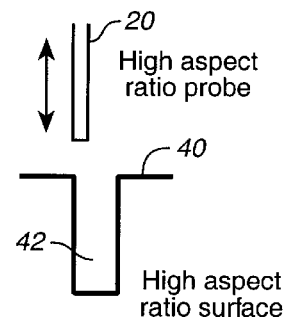
FIG._1D
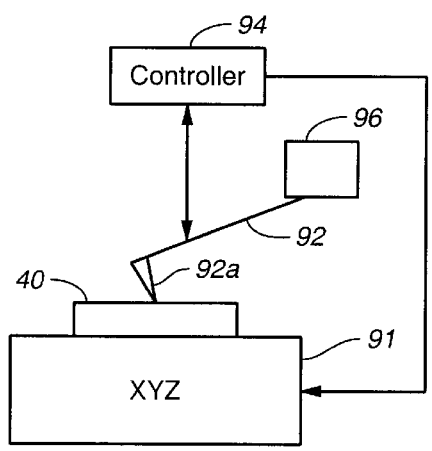
FIG._2B

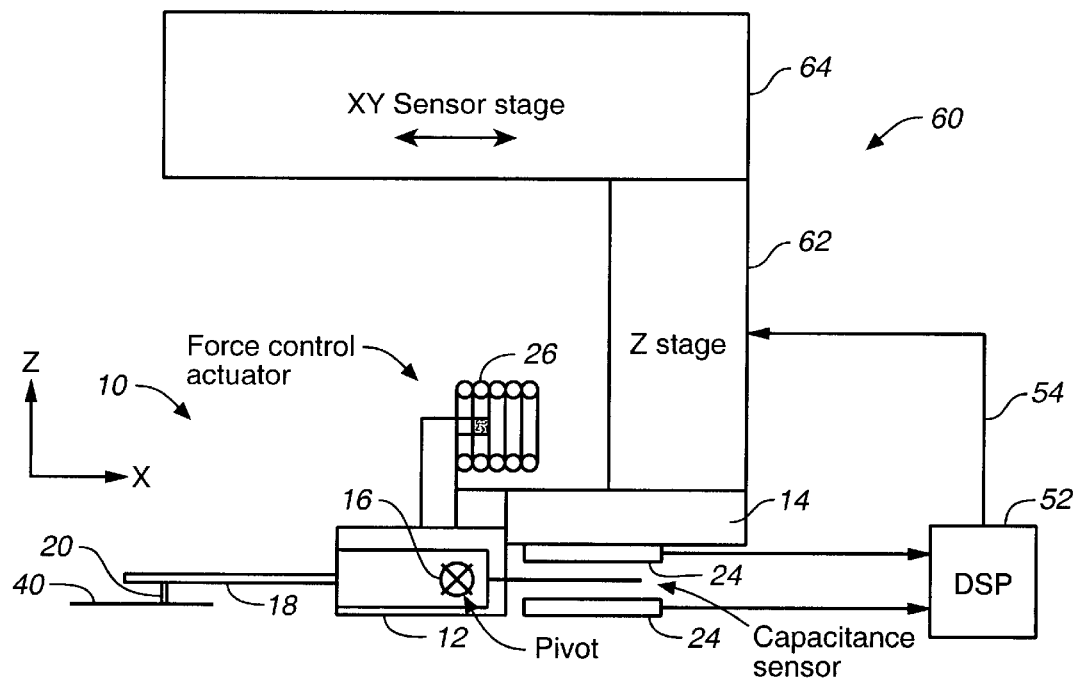
FIG._2A
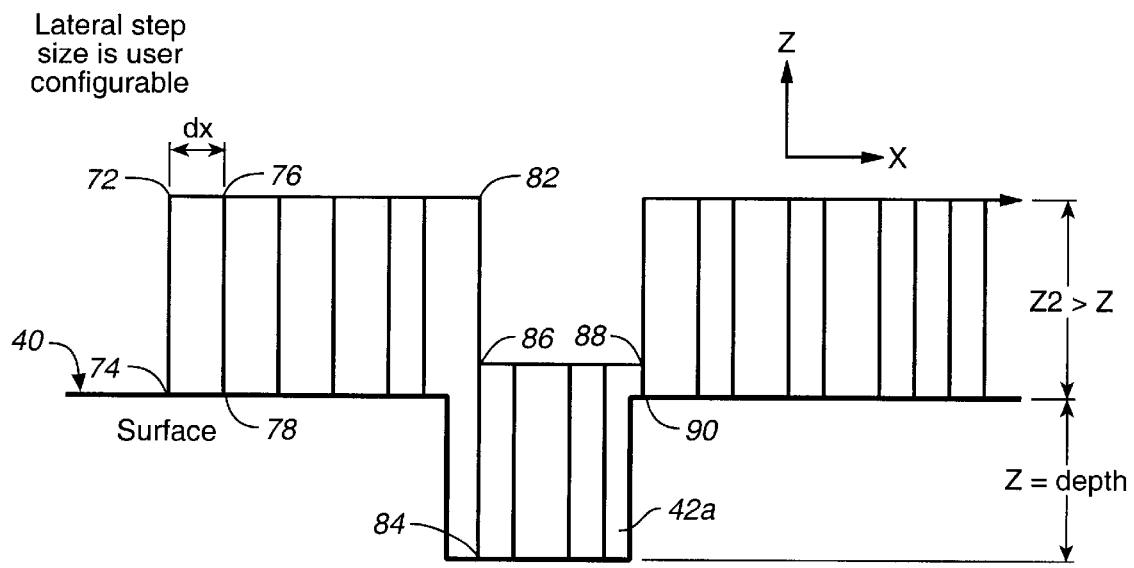
FIG._3

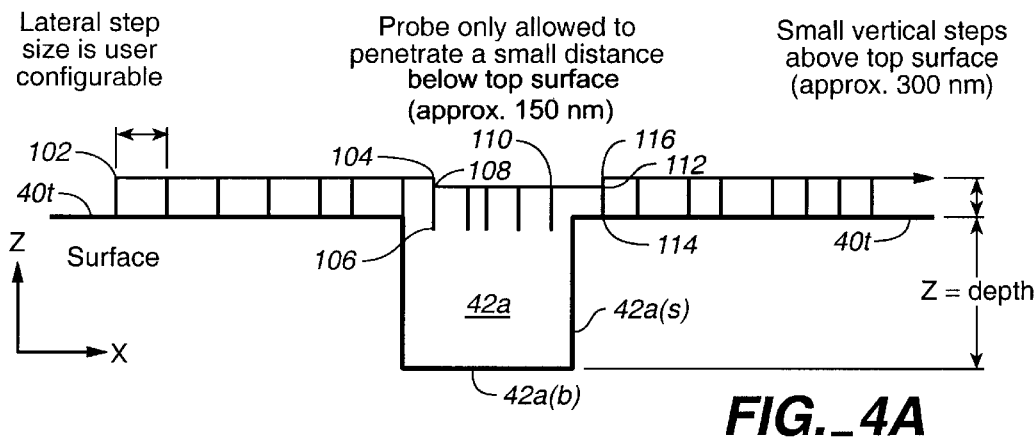
FIG._4A
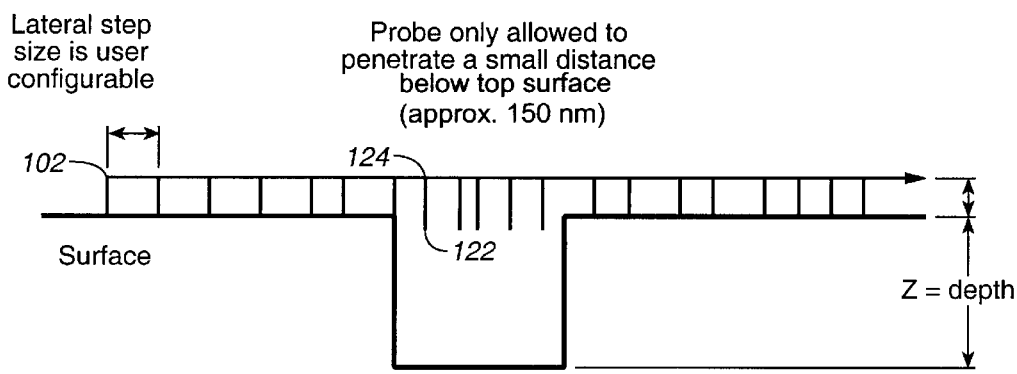
FIG._4B
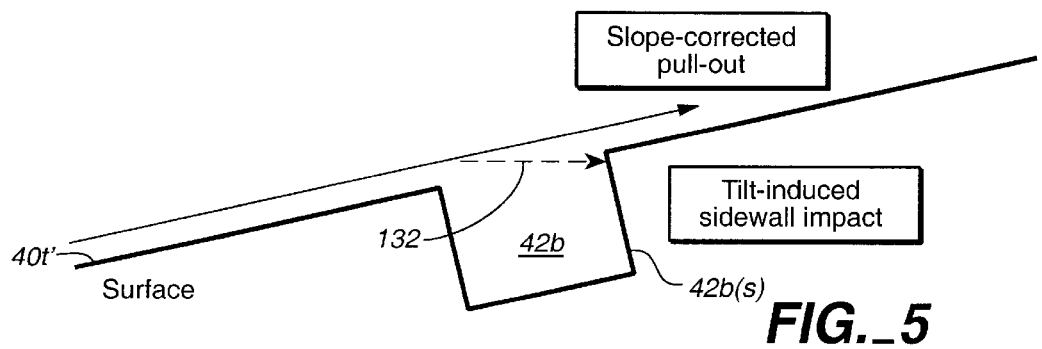
FIG._5

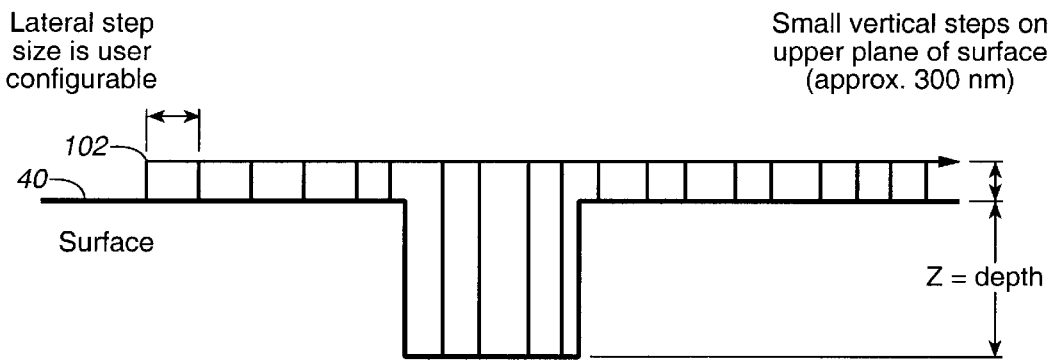
FIG._6
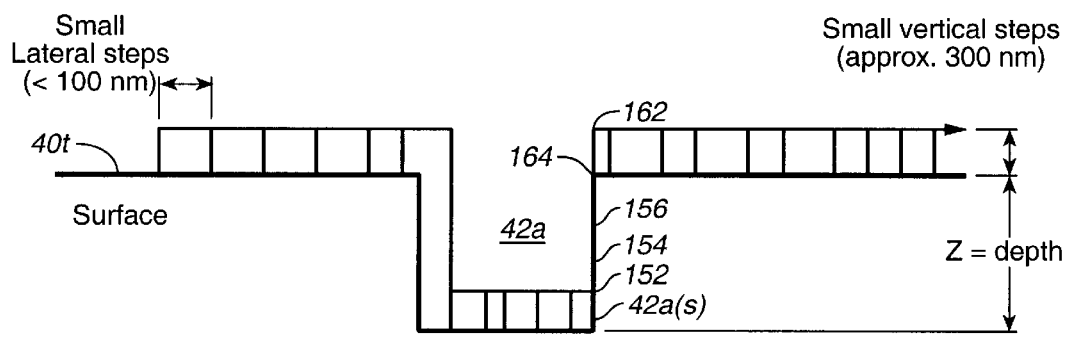
FIG._7A
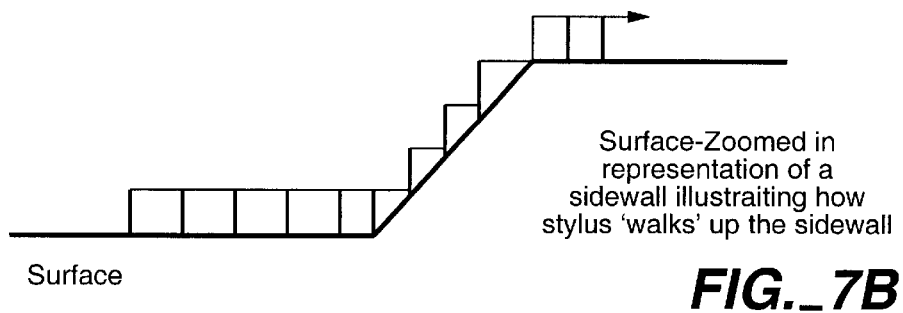
FIG._7B

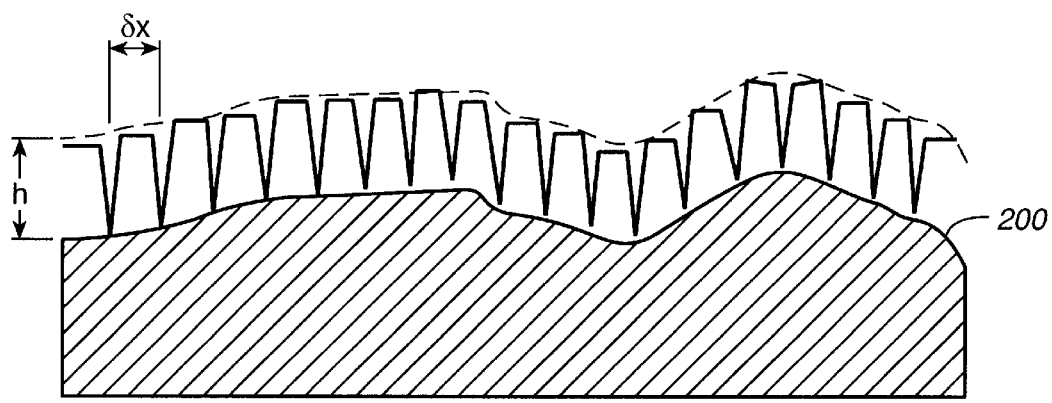
FIG._8A
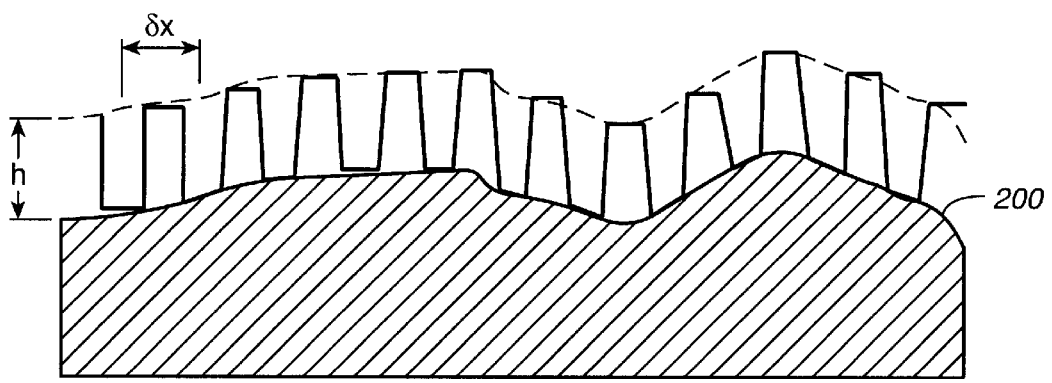
FIG._8B
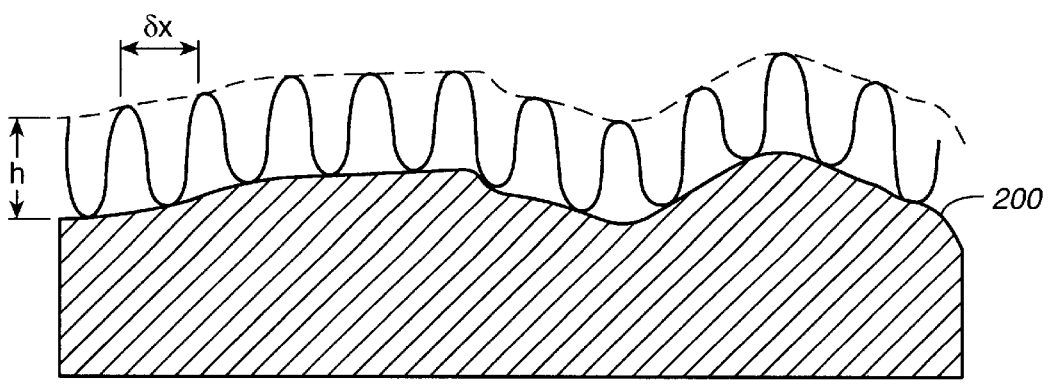
FIG._8C

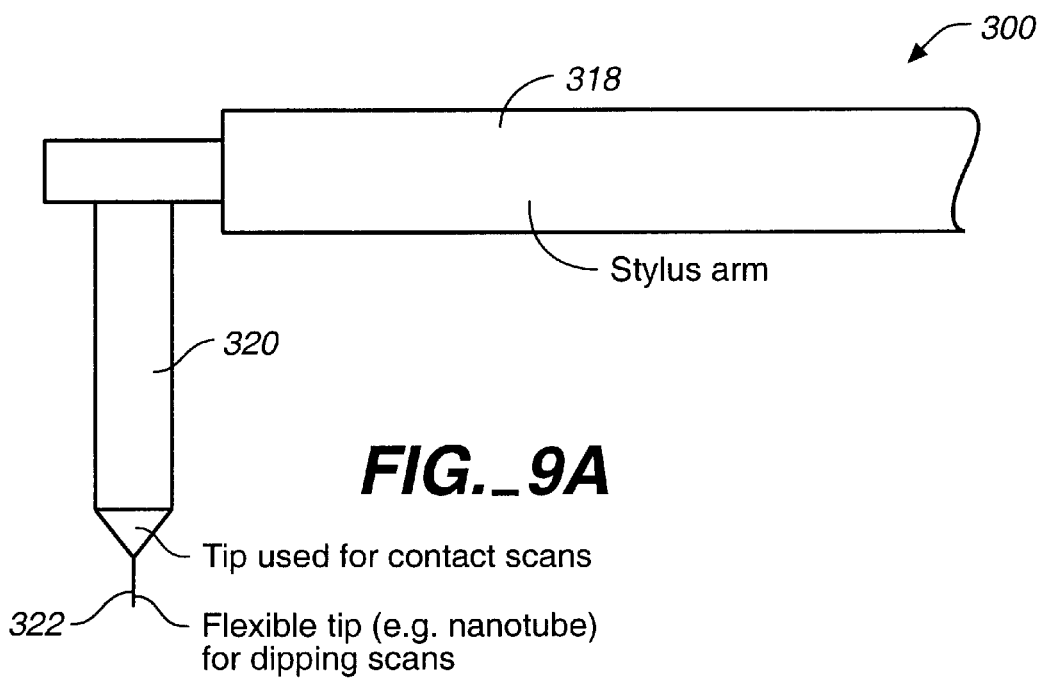
FIG._9A
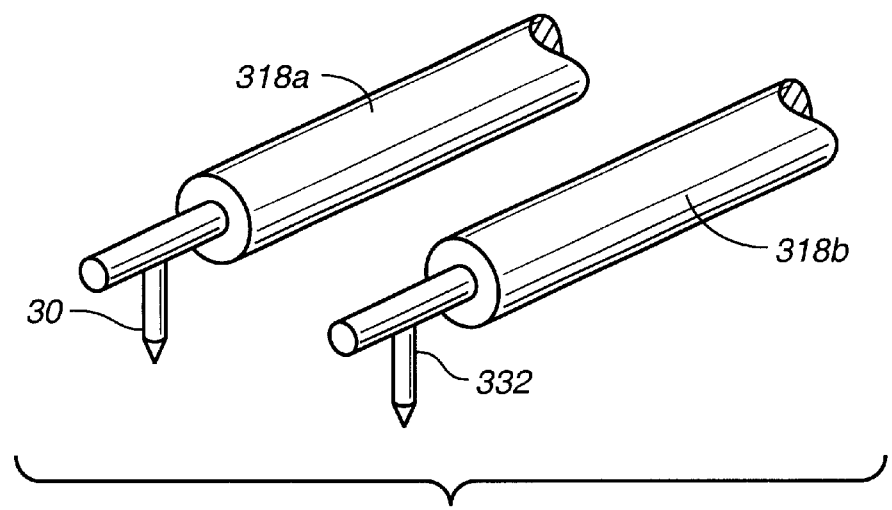
FIG._9B

SYSTEM FOR SENSING A SAMPLE

CROSS REFERENCE TO RELATED APPLICATIONS

This application is a continuation-in-part of application Ser. No. 08/730,641, filed Oct. 11, 1996, now U.S. Pat. No. 5,948,972, entitled "Dual Stage Instrument for Scanning a Specimen" which, in turn, is a continuation-in-part of application Ser. No. 08/598,848, filed Feb. 9, 1996 now abandoned, which, in turn, is a continuation-in-part of application Ser. No. 08/362,818, filed Dec. 22, 1994, now U.S. Pat. No. 5,705,741.

BACKGROUND OF THE INVENTION

Stylus profilers are used for obtaining surface profiles of samples. The stylus of the profiler follows the surface under a small contact force, and the resulting motions of the stylus are measured with a sensor assembly. The sensor assembly includes a stylus, a mechanical linkage (usually a stylus arm) connecting the stylus to a flexure pivot, and a transducer. When the stylus is scanned across the surface of the sample, the force exerted by the sample surface on the stylus causes a rotation of the stylus arm about the flexure pivot. The vertical displacement of the stylus is converted by the transducer into an electrical signal which indicates the profile of the sample surface.

Advanced profilers also include a force control mechanism, such as an electromagnetic actuator, for maintaining a constant contact force between the stylus and the sample surface as the stylus is scanned across the surface. To maintain a constant contact force between the stylus and the sample surface, the spring action of the flexure pivot is calibrated and the force control magnetic actuator is controlled to counteract the change in the force applied by the flexure spring on the stylus caused by rotation of the stylus arm. Thus, a constant force is exerted by the stylus against the sample surface, as the stylus is scanned across the surface. As an example of a profiler which has been used in the semiconductor and disk drive industries, please see U.S. Pat. Nos. 5,705,741 and 5,309,755; both patents are incorporated herein in their entirety by reference.

As the semiconductor industry progresses to smaller dimensions with each new generation of products, there is an increasing need for scanning instruments that can measure sub-micrometer scale surface features. While the depths or vertical dimensions (dimensions normal to the plane of the wafer surface) of the features such as trenches, or via holes, in semiconductor wafers, commonly exceed one micrometer, the lateral dimensions (dimensions in the plane of the wafer surface) have been continually reduced. At the current state of the art, the lateral dimensions of features such as trenches are less than 0.5 micrometer. With the continual reduction of the lateral dimensions of features such as trenches and via holes in the surface of semiconductor wafers, the ratio of depth to the lateral dimension of such features, also known as the aspect-ratio, is continually increased.

In order to measure such high aspect-ratio features, a very sharp, thin but long (high aspect-ratio) stylus must be used. However, a sharp, thin but long stylus is fragile and may easily break, especially when subjected to lateral forces (forces in directions in, or parallel to, the plane of the sample surface). Thus, when a high aspect-ratio stylus contacts a steep feature, such as the side wall of a trench or via hole, the contact force has a relatively large lateral component and a relatively small vertical component. Stylus profilers, such as the profilers described in the two patents referenced above, are designed such that motion of the stylus is constrained to one degree of freedom, namely, rotation about the flexure pivot. This degree of freedom is substantially normal to the sample surface. The stylus arm is relatively stiff in all other degrees of freedom. Consequently, the lateral forces generated when the high aspect-ratio stylus encounters a steep wall can easily break the stylus and damage the sample being measured.

The stylus arm in a profiler has a single degree of freedom, which comprises rotations about a pivot. The stylus or sensing tip travels along a path normal to a radial line passing through the center of rotation at the pivot and the tip. Since the sensing or stylus tip must be located "below" or at a lower elevation than the pivot to ensure that the tip and not the body of the sensor assembly contacts the sample, the motion of the stylus or sensing tip is not truly normal to the plane of the sample surface, but is in the shape of an arc. While the main direction of travel of the tip is downwards, it nevertheless also travels in the lateral direction in the plane of the sample surface. This lateral motion is also known as parasitic motion of the sensing tip. The parasitic motion of the sensing tip may hamper or even preclude the sensor assembly from measuring relatively deep and narrow features.

It is therefore desirable to provide an improved surface measurement system which overcomes the above drawbacks.

SUMMARY OF THE INVENTION

The above-described difficulties can be overcome by allowing the sensing tip of the profiler to contact the sample surface without substantially rotating the stylus arm about the pivot. Instead, a distance between the sample and the sensing tip of the profiler is reduced until the tip touches the sample, without moving the tip and the sample laterally relative to each other. By avoiding lateral relative motion between the tip and the sample before the tip touches the surface, the above-described problems are avoided. When such a scanning process is used, thin and long (high aspect-ratio) styli can be used to penetrate high aspect-ratio features for measurement. Data related to the height of the sample may then be measured with the tip stationary and in contact with the sample. After the measurement, the tip and the sample are separated and moved laterally relative to each other to measure the sample surface at a different location.

With minor modifications, the above-described scanning process may also be applied to other scanning instruments, such as the scanning probe microscope, which includes atomic force microscopes and scanning tunneling microscopes.

As described above, the feature on the sample surface may be found and measured by repeatedly causing the sensing tip (of the profiler or scanning probe microscope, for example) and a sample to repeatedly contact at different locations of the sample surface. In this process, the sensing tip and the sample are brought together substantially without lateral relative motion between them until they contact, separated again substantially without lateral relative motion between them, and moved laterally relative to each other until the tip is at a location above a different portion of the sample. This process is repeated at different locations of the sample. If the separation between the tip and the sample during such lateral motion is less than the change in height of the sample surface, the lateral motion will cause the sensing tip to contact the sample surface laterally, thereby causing damage to the sensing tip. To reduce the probability of such damage, the separation may be increased to a large value before lateral relative motion is initiated. If no knowledge of the height variation or distribution of the sample surface is available, such value should be large enough that it exceeds any probable height variations of the sample surface one may encounter. The resulting process can be quite time consuming, especially if the sample surface is to be measured at many different locations. This difficulty can be avoided by separating the tip and the surface by just enough to avoid such lateral contact.

A number of techniques may be employed to assure that the sensing tip and the sample are separated by an adequate distance so that the sensing tip will not contact the sample surface during the subsequent lateral relative motion. In the preferred embodiments, if certain height information is provided concerning the sample surface or a portion thereof (such as within a target area), then the sensing tip may be positioned at or close to the portion of the sample having the highest elevation. If the height information of the sample surface or a portion thereof is not readily available, such information can be acquired quickly by actually measuring the height of the surface at several sampling locations. Yet another technique that can be employed is to actually measure data related to the height of the sample when the tip and the sample come into contact as the tip is scanned across the sample and use such measured data to predict an elevation of the next location of the sample to be measured, so that the separation between the tip and the sample can be set to be higher than such predicted elevation. These are, of course, only some examples of the techniques that can be used to implement the above general concept.

In some applications, it may be desirable to first find the feature quickly, and then take an appropriate amount of time to actually measure the feature. In this instance, the distance between the sensing tip and the sample is controlled so that the distance between the tip and the sample is periodically increased and then decreased as the tip scans across the sample surface until the tip either touches the surface or until either the tip or the surface has traveled, or the two together have traveled in aggregate, by a preset distance without causing the tip and the surface to contact. In other words, the sensing tip does not completely penetrate the feature when scanning across the surface.

For some applications, to save time, even without any prior knowledge concerning the topology of the sample surface, the sample surface can be quickly scanned and measured without incurring undue risk in breaking the sensing tip. This involves determining whether the tip and the surface remain in contact after the distance between them is increased to a predetermined value, before lateral relative motion between them is initiated or continued. If the tip and the surface remain in contact after they are being separated from each other by a predetermined distance, the distance between them is further increased until they are no longer in contact before moving the tip and the surface laterally with respect to each other.

A sensor assembly having a sensing probe may be used in any one of the above-described processes for sensing the sample. The sensor assembly includes a base portion and a moveable sensing tip connected to the base portion. When the tip contacts the sample, the tip may move relative to the base portion of the sensor assembly. A moving stage is used to cause vertical relative motion between the sensor assembly and the sample. Thus, when the moving stage causes a distance between the sensor assembly and a sample to be reduced until the sensing tip contacts the sample, the actual change in distance between the sensing tip and the sample is given by a combination of the relative motion between the sensor assembly and the sample, and of the relative motion between the sensing tip and the base portion. By taking into account both motions, a more accurate measure of data related to the height of the sample can be obtained. In different embodiments, the sensor assembly may be that of a profiler, an atomic force microscope or other types of scanning probe microscopes.

One way to increase measurement speed while avoiding significant lateral forces between the sensing tip and the sample is to separate the process into two parts: an initial fast find mode to find the feature of interest, and after finding the feature, a second measurement mode to measure the feature.

As one possible embodiment of the invention to implement the above two part process, the sensing tip is scanned across the sample surface with the tip in contact with the surface until the feature is found. Scanning the sensing tip across the surface with the tip in contact with the surface speeds up the scanning process. After the feature is found, the sensing tip is scanned across the feature with the tip in intermittent contact with the sample surface to measure the feature. In this manner, the time required to find and measure the feature is reduced without undue risk of large lateral forces between the sensing tip and the sample surface. In the preferred embodiment, two different styli with known tip offsets are used in this process. The first stylus is used to scan while in contact with the surface to find the feature. The second stylus is then used to measure the feature.

In yet another aspect of the invention, a sensor assembly having a sensing probe with a sensing tip is employed. When the sensing tip of the probe is used for sensing a sample, the vertical distance moved by the sensor assembly (or by both the assembly and the surface in aggregate) until the tip contacts the surface within a feature of interest may be taken as the depth of the feature. To determine that the tip has contacted the surface, the sensor assembly is driven towards the surface until the distance moved by the tip relative to the assembly exceeds a threshold, at which point the vertical relative motion between the tip and the surface is stopped and the vertical distance moved by the assembly (or the sum of the distances moved by both the assembly and surface) is noted to indicate the depth of the feature. To yield a more accurate measure of such depth, the motion of the probe tip relative to the assembly is taken into account in calculating such depth.

BRIEF DESCRIPTION OF THE DRAWINGS

FIG. 1A is a schematic view of a prior art stylus sensor assembly, similar to that of U.S. Pat. No. 5,309,755.

FIG. 1B is a schematic view of how a high aspect-ratio sensing tip may be destroyed by large lateral forces generated when the sensing tip contacts a side wall in a conventional profiling scheme.

FIG. 1C is a schematic view of a sensing tip of the stylus sensor assembly and the high aspect-ratio feature illustrating the arcuate motion of the stylus, or its parasitic motion, which prevents the tip from reaching the bottom of high aspect-ratio features in a conventional profiling scheme.

FIG. 1D is a schematic view illustrating how the probe of the stylus sensor assembly may be lowered without rotation in order to reach the bottom of high aspect-ratio features.

FIG. 2A is a schematic view of a profiler which includes the stylus sensor assembly of FIG. 1A controlled by a digital signal processor and mounted to both a Z stage and an XY stage to illustrate the preferred embodiment of this invention.

FIG. 2B is a schematic view of an atomic force microscope (AFM) with an XYZ stage for moving the sample to illustrate this invention.

FIG. 3 is a schematic view of the scanning path of the sensing tip in the profiler of FIG. 2A to illustrate one embodiment of the invention.

FIG. 4A is a schematic view of the scanning path of the sensing tip in the profiler of FIG. 2A or the AFM in FIG. 2B to illustrate a fast find mode of this invention.

FIG. 4B is a schematic view of the scanning path of the sensing tip in the profiler of FIG. 2A or in the AFM in FIG. 2B to illustrate another embodiment of the fast find mode of this invention.

FIG. 5 is a schematic view of the scanning path of the sensing tip in the profiler or in the AFM of FIGS. 2A and 2B along an inclined surface of the sample with a feature to illustrate another aspect of the invention in the fast find mode.

FIG. 6 is a schematic view of the scan path of the sensing tip in the profiler or in the AFM in FIGS. 2A and 2B to illustrate the fast profiling mode, where the tip is positioned using knowledge of the surface height distribution of the surface to be scanned.

FIG. 7A is a schematic view of the scan path of the sensing tip in the profiler or in the AFM of FIGS. 2A and 2B in a quick step mode of this invention where no surface height distribution information is utilized.

FIG. 7B is a schematic view of a scan path of the sensing tip in the profiler or in the AFM of FIGS. 2A and 2B in a quick step mode of this invention, illustrating how the sensing tip senses an inclined side wall.

FIGS. 8A–8C are cross-sectional views of a surface in intermittent search paths employing the sensing tip of FIGS. 2A or 2B to illustrate another embodiment of the invention. This embodiment is taken from parent application Ser. No. 08/730,641.

FIG. 9A is a schematic view of a stylus arm and two sensing tips to illustrate another embodiment of the invention.

FIG. 9B is a simplified perspective view of a portion of a stylus sensor assembly with two probes, each probe having a sensing tip to illustrate another embodiment of the invention.

For simplicity in description, identical components are identified with the same numerals in this application.

DETAILED DESCRIPTION OF THE PREFERRED EMBODIMENT

FIG. 1A is a simplified schematic view of a stylus sensor assembly similar to the one of U.S. Pat. No. 5,309,755 useful for illustrating this invention. As shown in FIG. 1A, stylus sensor assembly 10 includes a base portion which includes the support body 12 and a transducer support 14 rigidly attached together. The support body 12 has a pivot 16 therein equipped with a spring so that the pivot 16 is a flexure pivot. Connected rotatably to the flexure pivot 16 is one end of a stylus arm 18 having a sensing tip or stylus 20 at or near the other end of the stylus arm. The stylus arm 18 is connected to a vane 22 on the other side of the pivot 16. Therefore, when the stylus 20 contacts a surface and is caused to move up or down, causing the stylus arm 18 to also rotate, vane 22 will rotate as well, thereby causing a change in the capacitance between the two capacitor plates 24 which are supported by the transducer support 14. The change in capacitance is fed to a digital signal processor (shown in FIG. 2A) which computes the distance rotated by stylus 20 from the change in capacitance.

The stylus arm 18 is biased downwards so that stylus 20 applies a force against the surface that is being profiled. This biasing is accomplished by means of a force coil 26 through which a current is passed. The amount of current passed through the force coil is such that stylus 20 applies a predetermined force against a surface during profiling. When the tip is rotated up or down by the sample, the flexure spring is stretched or compressed, where such stretching or compression applies a variable force in addition to the force applied by the current in the force coil. As a further improvement as set forth in U.S. Pat. No. 5,705,741, the effect of the flexure spring when the tip is rotated about pivot 16 is calibrated so that the amount of current applied to the force coil 26 is altered as a function of the displacement of stylus 20, to thereby substantially cancel out the effect of the flexure spring on the force applied by the tip 20 to the sample. In this manner, the force applied by stylus 20 to the sample surface remains constant despite rotation and displacement of the stylus.

FIG. 1B illustrates a possible scenario where a high aspect-ratio stylus 20 of the stylus sensor assembly 10 is used to profile a high aspect-ratio feature, such as a deep trench or via hole. As shown in FIG. 1B, stylus or sensing tip 20 scans the surface 40 of a sample, by causing lateral relative motion between the stylus 20 and surface 40, shown along the X axis in FIG. 1B. When the sensing tip 20 enters a high aspect-ratio feature, such as a trench or via hole 42, large lateral forces (forces in directions substantially along or parallel to the sample surface 40, such as along the X axis) will be generated, which may cause a portion of the stylus or sensing tip 20 to break off when it contacts the side wall of the feature.

As noted above, stylus 20 is rotated about pivot 16 by the sample surface 40 when it is scanned across the sample surface. Therefore, stylus 20 travels along a path 44 which is curved or arcuate in shape. For high aspect-ratio features, such arcuate motion of the stylus or sensing tip 20 may make it impossible for the sensing tip to reach the bottom of the trench or hole 42.

This invention is based on the recognition that, in order to avoid the problems described above in reference to FIGS. 1B, 1C, instead of rotating stylus or sensing tip 20 about pivot 16 in order to measure the bottom of high aspect-ratio features, the stylus 20 is simply lowered vertically into the feature 42 without rotating the stylus 20 or stylus arm 18 about pivot 16 as illustrated in FIG. 1D. As shown in FIG. 1D, if the stylus 20 is simply lowered into the feature 42 without moving the tip and the sample laterally relative to each other and without substantially rotating the arm about the pivot, then it is possible for stylus or sensing tip 20 to reach and measure the bottom of feature 42.

In order to lower the stylus 20 into the feature, stylus sensor assembly 10 is mounted onto a Z stage 62 and an XY stage 64 as illustrated in FIG. 2A. FIG. 2A is a schematic view of a profiler which includes the stylus sensor assembly 10 of FIG. 1A controlled by a digital signal processor 52 and mounted to both a Z stage and an XY stage to illustrate the preferred embodiment of this invention. As shown in FIG. 2A, the transducer support 14 of the base portion of stylus sensor assembly 10 is attached to the Z stage 62 which, in turn, is attached to the XY stage 64. Therefore, the stylus 20 may be lowered into the feature 42 of FIG. 1D by means of Z stage 62, by lowering the entire stylus sensor assembly 10. In this manner, the abovedescribed problems associated with the operation in FIGS. 1B, 1C can be avoided. Z stage 62 raises or lowers the stylus sensor assembly 10 without moving the stylus 20 laterally relative to the sample surface 40. The XY stage 64 causes lateral relative motion, for example, in the X direction, between the stylus 20 and the sample surface 40; the X direction is substantially parallel to the sample surface 40.

FIG. 3 is a schematic view of a scan path of the stylus tip 20 of FIG. 2A for finding and measuring a feature in the surface to illustrate one embodiment of the invention. Thus, stylus sensor assembly 10 is positioned so that stylus 20 is at position 72 above a location 74 of the sample surface 40. Stylus 20 is then lowered by means of Z stage 62 by lowering the entire stylus sensor assembly until it is determined that stylus 20 touches or is in contact with surface 40 at location 74. Stylus 20 is then raised, again by means of Z stage 62 by raising the entire stylus sensor assembly 10 until the stylus 20 is again at the starting point 72. The XY stage 64 then causes lateral relative motion between the sample surface and the stylus 20, by moving the stylus sensor assembly 10 and the Z stage 62 along the X direction by a predetermined step size dx to point 76 which is above another location 78 of the sample surface 40, where location 78 is spaced apart from but adjacent to location 74. The Z stage 62 is again used to lower stylus 20 by lowering the stylus sensor assembly 10 until it is determined that stylus 20 is in contact with the surface 40 at location 78. Stylus 20 (and the stylus sensor assembly) is then raised by means of Z stage 62 back to point 76 and lateral relative motion between the sample surface and stylus 20 is again caused by XYstage 64. The lateral motion step size dx may be in a range of about one nm to fifty mm.

It is noted from the above description that when the distance separating the stylus or sensing tip 20 and the sample surface 40 is increased or decreased, there is substantially no lateral relative motion between the sample surface and the stylus. Points 72, 76 . . . to which the stylus 20 is raised after contact with the sample surface are at a distance of Z2 above sample surface 40. In the embodiment of FIG. 3, after each time the stylus contacts the surface 40, the stylus is raised by the same amount Z2 above the location of the sample surface it was in contact with prior to the raising. Therefore, as will be shown below, if this distance Z2 is greater than the depth of any feature that the stylus may encounter during the scanning motion of the stylus across sample surface 40, then the stylus would not come into lateral contact with any side walls of the sample surface 40 to cause the type of problems described above in reference to FIGS. 1B, 1C.

Thus, the above process of lowering, raising, and lateral movement in reference to FIG. 3 is repeated until the stylus is at point 82 above location 84 within a feature 42a of the sample surface. The Z stage 62 lowers the stylus sensor assembly and the stylus until the stylus contacts the sample surface at location 84 within the feature 42a. Then when the Z stage 62 raises the stylus by distance Z2, since Z2 is greater than the depth Z of any feature on the sample surface 40, including the depth of feature 42a, after the Z stage 62 raises the stylus to point 86, point 86 will be at an elevation higher than sample surface 40. Therefore, when the XY stage 64 causes lateral relative motion between the sample surface 40 and stylus 20 along the X axis, stylus 20 will not come into contact with any side walls of feature 42a. Thus, the scanning process continues until the stylus reaches point 88 where it is above location 90 on surface 40 outside feature 42a. The Z stage 62 lowers stylus 20 by a short distance when it comes into contact with surface 40 at location 90. Then again, Z stage 62 raises the stylus to point 92 by a distance of Z2 above location 90 before the XY stage 64 again causes lateral relative motion between the sample surface 40 and stylus 20, to repeat and continue the above-described intermittent contact scanning across surface 40. Obviously, in all of the embodiments of this application, instead of moving the stylus sensor assembly of the profiler (or of AFM, SPM) to cause relative motion between the sensing tip and the sample surface, such relative motion can be caused by moving the sample instead or a combination of motions of the sample and of the sensing tip; all such variations are within the scope of the invention.

In reference to FIG. 2A, when stylus 20 comes into contact with surface 40, surface 40 will cause stylus arm 18 and stylus 20 to be rotated about pivot 16 while Z stage 62 continues to lower stylus sensor assembly 10 towards the surface 40, while system 60 is determining whether the tip 20 has contacted the sample surface. In order to be certain that stylus 20 has indeed come into contact with surface 40, it is preferable for a threshold distance to be set, and it is determined that stylus 20 has come into contact with surface 40 only after the distance rotated by stylus 20 about pivot 16 has exceeded the threshold distance. Such threshold distance may be a parameter that can be set through the digital signal processor 52. Thus, when the change in capacitance across capacitance plates 24 caused by rotation of stylus arm 18 and vane 22 indicates that a distance rotated by stylus 20 is equal to or has exceeded the threshold distance, the digital signal processor 52 will send a signal along one of the lines 54 to Z stage 62 to cause the Z stage to stop lowering the stylus sensor assembly 10.

Since the stylus sensor assembly of the profiler continues to be lowered towards the sample after the tip 20 touches the sample and the lowering motion is stopped only after the tip has been rotated by a threshold distance, the stylus sensor assembly has been lowered by a distance greater than the distance traveled by the sensing tip, by the distance rotated by the tip. In order to measure the height of surface 40, the Z stage 62 records the distance that the stylus sensor assembly 10 has been lowered until it is determined that stylus 20 has come into contact with surface 40. If such distance is taken as the distance between the starting point of stylus 20 and the end point in the lowering process, such as the distance between point 72 and 74, such distance may actually be greater than the distance traveled by stylus 20, by the distance that is rotated by stylus 20, after the tip contacts the surface but before the Z stage 62 stops lowering stylus sensor assembly 10. The DSP 52 sends a signal along one of the lines 54 to the controller (not shown) of the Z stage 62 to indicate the actual distance rotated by stylus 20 before motion of the Z stage is stopped and the controller of the Z stage will then subtract such distance from the distance that the Z stage 62 has moved stylus sensor assembly 10, to obtain a more accurate measure of the actual distance traveled by stylus 20. This will give a more accurate measure of data related to the height of sample surface 40 and of the profile of any features of interest in the sample surface.

The methods of this invention described herein for finding and measuring surface features may be carried out by means of SPMs instead of profilers. In such event, instead of raising or lowering a stylus sensor assembly, one would raise or lower a SPM sensor assembly. Where an AFM is used instead of a profiler stylus sensor assembly as the sensing probe, a threshold distance can also be defined to determine when the probe tip has come into contact with the sample surface. FIG. 2B is a schematic view of an AFM with an XYZ stage 91 for moving the sample to illustrate this invention. As shown in FIG. 2B, the amount of bending of the cantilever arm 92 is monitored in a conventional manner (such as by sensing the strain in the arm 92, or by the amount of bending of the arm), and controller 94 causes the probe or the arm to be lifted or lowered to maintain a constant strain or amount of bending in the arm. If the tip 92a of arm 92 has come into contact with the sample surface, this will cause a strain and bending of the arm. In other words, when the sensing probe carrying the sensing tip or stylus approaches the sample surface, if the tip comes into contact with the surface, the continued motion of the probe towards the surface will cause the arm to bend and strain to develop in the arm, where the strain developed and the amount of bending will correspond to the distance moved by the probe and sensor assembly after the tip is in contact with the surface. Thus, a threshold distance may be set which corresponds to a value for the strain or bending of the arm. By sensing whether the strain or bending of the arm has exceeded such value, it is possible to determine whether the tip 92a has come into contact with sample surface. The same process can be performed for other SPMs such as the scanning tunneling microscope, by setting a threshold value for the current between the tip and the sample, for example.

Measurements of surface profiles and depths of features using the SPM can be improved in accuracy in the same manner as that described above. Where the sensing tip of a AFM is used in the depth measurement, for example as shown in FIG. 2B, the probe 92 and tip 92a are caused to approach the surface until the tip 92a touches the surface, and the probe is driven further towards the surface until it is determined that the strain in the probe or amount of bending of the probe has reached a certain threshold. The distance moved by the tip relative to the SPM probe positioner 96 (which forms a base portion of the AFM sensor assembly, not completely shown in FIG. 2B) when the sensor assembly is driven towards the surface should be taken into account (e.g. by subtracting such distance from the depth measurement) when calculating the depth of a feature.

While the process or mode of operation illustrated in FIG. 3 may be advantageous for some applications, it may be time consuming and cumbersome for other applications, since the stylus must be raised to a distance greater than the expected height variation or height distribution of sample surface 40. This is true especially where the sample surface 40 is inclined or tilted. In such circumstance, or in others where one is unsure of the amplitude of height variations of the sample surface, in order to avoid lateral contact between the stylus and any side walls, the stylus must be raised to relatively large heights above the sample surface 40. This may be time consuming and cumbersome.

In order to avoid having to raise the stylus by distances much larger than the actual height variations of the sample surface, it will be useful to have some prior knowledge of the height distribution of the sample surface (e.g. within a target area) before scanning starts. For example, if the portion or point of the highest elevation of the sample surface is known, the stylus 20 may be positioned at a point directly above or close to such highest point or portion before scanning starts. Then such starting point and the distance by which the tip is subsequently raised above the prior point of contact with the sample surface can be much reduced. In one embodiment, such distance can be in a range of about 100 to 500 nanometers. Then the above-described procedure in reference to FIG. 3 may be carried out without the risk of the stylus coming into lateral contact with a side wall of the sample surface, where Z2 can be reduced to the sum of the expected feature depth and a shorter distance such as one in a range of about 100 to 500 nanometers.

When prior knowledge of the sample surface 40 is not available before scanning starts, it may be a simple and fast procedure to obtain such height distribution information by carrying out the process as illustrated in FIG. 3, with Z2 at a large value, but only at a few sampling locations of surface 40, such three to twenty five locations. Since the heights of only a few locations of the sample surface 40 are measured, this process will not take an inordinate amount of time even when a large value of Z2 is used. Typically, the user is able to position the stylus sensor assembly over the general area of a feature of interest, such as at a point that is above a surface location within about one or two microns from the feature of interest. Therefore, a target area of several microns by several microns (e.g. two by two microns) may be defined, and the several sampling locations chosen within the target area. The above-described process in reference to FIG. 3 may be carried out only at such locations in such small target area to find out the height distribution over such area. After the height distribution of the target area is known, then the stylus may be positioned at a point which is above a portion of the sample surface which is at or close to the point of highest elevation in the distribution. It should be noted that, even if the stylus is not placed immediately above the point of the highest elevation of the target area, as long as the distance by which the stylus is raised after contacting such point causes the stylus to be higher in elevation than any portion of the sample surface within the target area, the stylus will not come into lateral contact with any portion of the sample surface to damage the stylus in the subsequent lateral relative motion between the tip and the surface. This allows the user a higher tolerance in positioning the tip.

The total time required for finding and measuring features of interest on a sample surface can be further reduced by separating the process into two parts: a first fast find mode in which the stylus does not necessarily completely penetrate the features of interest so as to first find the features, and a second measuring mode for measuring the features found. This permits the stylus to be raised or lowered by short distances during the fast find mode in order to find the feature, and a subsequent measurement mode in which the stylus penetrates the features by touching the sample surface at one or more locations within a feature of interest for measuring data related to the height of the feature and of the surrounding sample surface. This is illustrated in reference to FIGS. 4A, 4B.

FIG. 4A is a schematic view of a scan path illustrating a fast find mod finding a feature. In the embodiment of FIG. 4A, it is assumed that information concerning height variations of sample surface 40 is available or has been measured, so that such information can be used to position the sensing tip of a stylus sensor assembly or SPM above the sample surface 40. Such positioning is particularly simple where the sample surface is characterized by two discreet levels or heights as illustrated in FIG. 4A. Thus, outside of the feature 42a, the sample surface is at a particular height, and within the feature, the sample surface has two side walls 42a(s) and a bottom portion 42a(b) at a depth Z below the top surface. In such event, as long as the starting position of the sensing tip is above the top surface by a certain distance, and the sensing tip is raised to the same elevation as the starting position above the sample surface each time the sensing tip is raised and separated from the sample surface, the sensing tip will not come into lateral contact with the sample surface such as side wall 42a(s).

To speed up the process of scanning in the fast find mode, the Z stage 62 lowers the sensing probe of the stylus sensor assembly or of the SPM until either the sensing tip of the probe touches the surface 40 of the sample or has been lowered by a preset distance. In one example, the sensing tip is placed a short distance (e.g. approximately 100–500 nanometers) above the top (upper) surface of the sample at the starting point. In a process similar to that described above in reference to FIG. 3, the sensing tip is lowered until it is determined that the sensing tip has come into contact with the sample surface without any substantial lateral relative motion between the sensing tip and the sample surface, raised again after such contact also without any substantial lateral relative motion therebetween to a point, moved laterally across the surface of the sample and the process repeated over a target area of the sample surface, similar to the process of FIG. 3.

The sample surface 40 has two discrete levels: a top level of surface portion 40$t$ and the level of the bottom surface 42$a(b)$ within the feature 42$a$. In this example, the sensing tip is raised by a short distance in a range of about 100–500 nanometers. In one embodiment, the tip is raised to about 300 nanometers above the top surface after each contact with the top sample surface 40$t$, except when the sensing tip is directly above bottom surface 42$a(b)$ of the feature 42$a$, at position 104. When the sensing tip is lowered into the hole or trench 42$a$, the lowering of the sensing probe is stopped after the probe has been lowered by a preset distance even though it is determined that the sensing tip has not come into contact with the sample surface. This is determined by the fact that the tip has not been caused to rotate by at least the threshold distance as described above, for example. In the same example, such preset distance may be 450 nanometers. In the embodiment of FIG. 4A, where the sample surface is at two discreet levels, this means that the sensing tip will be lowered to a position 106 approximately 150 nanometers below the top discreet level of the sample surface 40$t$ at which point the lowering motion of the sensing probe would be stopped. The sensing tip is then again raised by the Z stage 62. In the embodiment of FIG. 4A, it is raised by the same distance each time, whether or not the sensing tip has contacted the sample surface, or in other words, by 300 nanometers. This means that when the sensing tip is scanning immediately above feature 42$a$, the sensing tip will be raised to only 150 nanometers above the top level of the sample surface 40$t$, to position 108. This process is repeated until the sensing tip is at position 110 at which point the XY stage 64 moves the sensing probe along the X axis to a position 112. Since points 110 and 112 are still approximately 150 nanometers above the top surface 40$t$ of the sample (FIG. 4A not drawn to scale), the sensing tip will not come into contact with the sample during this lateral relative motion. The sensing tip may then again be lowered by the Z stage which lowers the entire sensing probe until the tip touches the surface at position 114. The tip is then raised to position 116 and the process is then repeated across the remainder of the sample surface within the target area.

The location of the feature can then be determined by recording the XY positions of the points at which the sensing tip was lowered by the preset distance but did not come into contact with the sample surface. After such process, the system is operated in a measurement mode in which the probe is lowered into feature 42$a$ until it is determined that the sensing tip has come into contact with the bottom 42$a$ ($b$) of the feature of 42$a$, in order to measure data related to the height or depth of the bottom surface of the feature. Since features of interest are typically small, the measurement mode is normally not very time consuming.

FIG. 4B is a schematic view of a scan path and of a sample surface similar to those illustrated in FIG. 4A, but where the sensing tip and the sensing probe are raised by a greater distance when they are immediately above the feature than when they are not. In the embodiment of FIG. 4B, for example, the sensing tip is raised to substantially the same elevation throughout the scan across the surface in the target area. Thus, as in the example of FIG. 4A, when the sensing tip and probe are above the sample surface but not above the feature 42$a$, the sensing tip is raised to approximately 300 nanometers about the top surface of the sample. Where the probe is immediately above feature 42$a$, the probe is raised so that the sensing tip is retrieved to the same elevation as the starting point 102. If the sensing tip is allowed to be lowered into the feature beneath the top surface of the sample by 150 nanometers (or lowering the tip by a total of 450 nm) to point 122 at which point the Z stage stops lowering the probe and sensing tip, then the Z stage would raise the probe and sensing tip by such preset distance which is 450 nanometers so that at point 124, the sensing tip is at the same elevation as the starting position 102. Aside from such difference, the scanning mode in FIG. 4B is substantially the same as that illustrated above in reference to FIG. 4A.

The scanning process described above in reference to FIGS. 4A and 4B is quite effective where the sample surface is level and the Z stage 62 raises and lowers the sensing probe and tip in directions substantially normal to the sample surface. In other words, the Z direction of motion of the Z stage 62 is substantially perpendicular to the sample surface 40. Where this assumption is not true, as would be the case where the sample surface is tilted with respect to the Z direction of motion of the Z stage, or where the sample surface has a portion that is inclined and has a slope, the above-described schemes may still cause the sensing tip to come into lateral contact with the sample surface, which may result in tip damage. Applicants have developed a technique to avoid such contact as described above in reference to FIG. 5.

As shown in FIG. 5, the sample surface is inclined with a certain slope. Thus, if the scanning process described above in reference to FIGS. 4A, 4B are employed, when the sensing tip is in or above the feature 42$b$ and scanning along the dotted line 132, the sensing tip may come into contact with the side wall 42$b(s)$ of the feature 42$b$, thereby causing tip damage. The above scenario can be avoided by actually measuring the slope of the top surface 40$t'$ during the fast find mode and use such data to predict the elevation of the next location of the sample surface to be sampled. Thus, from data related to the height of the top surface 40$t'$ at the various locations of the surface taken before the sensing tip reaches the feature 42$b$, a slope of the top surface 40$t$ may be derived by means of the digital signal processor 52. Such slope may then be used to predict the elevation of another portion of the top sample surface 40$t'$ yet to be sampled by the sensing probe. Therefore, even though the sensing tip does not come into contact with the sample surface when it is immediately above feature 42$b$, such slope information is used and extrapolated so that the scanning path follows the general slope of the top surface 40$t$ and so that when the scanning probe reaches the vicinity of side wall 42$b(s)$, the sensing tip will be at an elevation above the side wall and not come into contact with it, as shown by the solid line scan path in FIG. 5. Where the top surface 40$t'$ of the sample is relatively flat, its slope can be calculated readily. Where the top surface 40$t'$ of the sample is not flat, the elevation of the next location of the sample surface to be sampled may be predicted by a curve fitting process which is known to those skilled in the art and will not be elaborated herein for that reason.

In some applications, it may be desirable to use information concerning height distribution of the surface that is provided or obtained as described above, and then simply find and measure features of interest within a target area, without separating the process into a finding process and a measuring process. This is illustrated in FIG. 6. Thus, as in the case of FIG. 4A, height information of the surface 40 is employed to position the sensing tip at a location 102 above the sample surface, where one is certain that the starting position of the sensing tip is at an elevation higher than any part of the target area of the sample to be measured. One can then be certain that the sensing tip will not come into lateral contact with the sample surface to cause tip damage. In the scanning process across the sample surface, the separation between the sensing tip and the sample surface is controlled so that the sensing tip comes into contact intermittently with the sample surface, where the sensing tip is lowered to contact the sample surface, and raised to the same elevation as the starting position 102 after each contact with the sample surface, without causing relative lateral motion between the sensing tip and the sample. Lateral relative motion is caused only when the sensing tip has been raised to the same elevation as that of the starting point 102. In other words, lateral motion is caused only when the sensing tip is at an elevation higher than all points in the target area of the sample surface so that the sensing tip will not come into lateral contact with the sample surface while lateral relative motion is caused between the sensing tip and the sample.

Thus, from the above several embodiments, it will be seen that a useful method for sensing a feature on the surface of a sample employing a sensing tip has been described. The sensing tip is positioned above one location of the surface. A distance between the surface and the sensing tip is reduced without substantially moving the tip and the surface laterally relative to each other. In the embodiment of FIG. 6, for example, the distance is reduced until the tip touches the surface. In the embodiments of FIGS. 4A, 4B and 5, the distance is reduced until the tip touches the surface or until the tip or the surface has traveled, or the tip and the surface together have traveled in aggregate, by a preset distance without the tip contacting the surface. A distance or separation between the tip and the surface is then increased without substantially moving the tip and the surface laterally relative to each other until such distance is substantially equal to a predetermined value. The predetermined value is such that after such separation has been increased to the predetermined value, the tip is higher in elevation than another location of the surface adjacent to and spaced apart from the one location. (This predetermined value may be one that is calculated and predicted from a measurement of the sample surface, such as that illustrated above in reference to FIG. 5 where the slope of top surface 40t is measured. Alternatively, such predetermined value may be arrived at by using knowledge of the height distribution of the sample surface, such as by measuring at a few sampling locations the height distribution of the sample surface within a target area as described above.) Lateral relative motion is then caused between the sensing tip only after the tip is raised by a distance equal to such predetermined value from the surface of the sample and the tip is positioned so that it is above another location. The steps immediately described above of reducing the distance, increasing the distance and causing lateral relative motion are then repeated at a plurality of locations of the surface to find or measure the feature. In the embodiments of FIGS. 4A, 4B, during the fast find mode, the height of the sample surface is not measured.

In the embodiment of FIGS. 5 and 6, on the other hand, data related to the height of the sample surface is measured. During such measurements, it is preferable for the sensing tip to be stationary and in contact with the sample. In the preferred embodiment, the predetermined value for judging how far to raise the tip may be not more than about one micron.

For many applications, it is desirable to quickly scan the surface to find and measure any features of interest without undue risk of damage to the tip and of obtaining false data. This is known as the quick step mode as illustrated in FIGS. 7A, 7B. In this mode, the sensing tip of a stylus sensor assembly (of a profiler or SPM) is placed at a small distance above one location of the sample, such as one between 100 and 500 nanometers. In one embodiment, the tip is raised to around 300 nanometers above the sample. The sensing tip is then scanned across the surface of the sample with the distance separating the sample and the tip controlled so that the sensing tip contacts the sample intermittently as it is scanned across the sample surface 40. After each contact with the sample, the sensing tip is raised to a small distance above the surface of the sample preferably without any substantial lateral relative motion between them, before lateral relative motion is caused between the sample and the tip. Such small distances may be the same during each raise and may be substantially the same as the initial separation, namely, about 300 nanometers. This mode of scanning runs the risk of the sensing tip contacting a side wall such as 42a(s) at location 152 as shown in FIG. 7A, but if the step size of the lateral relative motion is chosen to be small, the sensing tip or stylus of the stylus sensor assembly or SPM may be able to stand the stress generated by the side wall impact at location 152. Thus, the mode of operation in the quick step mode of FIG. 7A is similar to that shown in FIG. 3, except that the vertical distances raised by the Z stage 62 may not be adequate to avoid lateral contact with the side wall. The quick step mode of FIG. 7A, however, differs from that in FIG. 3 in that it is further determined whether the sensing tip and the surface are in contact after a vertical step has been taken to increase the distance between the sensing tip and the sample.

After a vertical step has been completed, the desired lateral relative motion is made. The tip is then made to approach the surface. If the tip rises relative to the sensor assembly as soon as the approach begins, no gap between the tip and the surface had resulted from the initial vertical step. This can be determined since the movement of the tip is monitored. Alternatively, the amount of movement of the tip relative to the sensor assembly can be monitored when the tip approaches the surface to determine whether the distance moved by the tip relative to the assembly has exceeded the set threshold as described above. In either case, another vertical step to increase the vertical separation between the sensing tip and the sample is carried out, at which point it is again determined whether the tip and the surface are in contact. In reference to FIG. 7A, for example, when the sensing tip contacts the side wall 42a(s) at location 152, the sensing tip will attempt to move laterally but will stay in contact with the side wall at location 152. The sensing system will then determine whether the tip and the surface are still in contact. Since the tip and the surface at location 152 are still in contact at such moment, any downward motion of the sensor assembly will cause the stylus to move relative to the assembly by the same amount and the downward motion is terminated. The sensor assembly is instead raised by another vertical step to location 154. At such location, the measurement system determines that the sensing tip and the sample are still in contact. The sensing tip is therefore again raised vertically to position 156 in contact with the side wall. This process is then repeated until the sensing tip reaches the position 162 after the vertical step, at which point the measuring system determines that the sensing tip and surface 40 are no longer in contact. At this point, the sensing tip is again lowered to come into contact with sample surface 40 at location 164 and raised again to position 162 before it is moved laterally as before to perform intermittent contact and measurement of the top surface 40t of the sample. In order to reduce the probability of tip damage, the steps of lateral relative motion may be over a lateral distance less than about 100 nanometers. FIG. 7B illustrates essentially the same process as in FIG. 7A, but as applied to a sample surface with an inclined surface portion.

In the conventional mode of operation of the stylus sensor assembly of FIG. 1A, a desirable tracking force is applied by applying an appropriate current through the force coil 26 so that stylus 20 applies a desired force against the sample surface that is being scanned. In the different modes of operation described above for this invention, however, the stylus or sensing tip of the stylus sensor assembly would start at a position not in contact with the sample surface. A preset value of a desired tracking force is set at the DSP 52. To improve the stability of scanning, an initial current is applied to the force coil 26 in FIG. 2A to compress the spring in flexure pivot 16 and to hold the stylus 20 at a steady position while the stylus sensor assembly 10 is being lowered and raised by the Z stage 62 or transported laterally by means of stage 64. When the stylus 20 touches the sample surface, a force will develop between the tip and the sample. Such force may increase as the tip is rotated above pivot 16 due to the action of the spring. If the force exerted by the spring caused by its stretching or compression is precalibrated as described in U.S. Pat. No. 5,705,741, then the amount of force between the tip and the sample can be found by the amount of rotation of the stylus 20 about pivot 16. DSP 52 compares such force to a preset value stored at the DSP. When the force between the tip and the sample reaches the preset value, DSP 52 applies a control signal to a power supply (not shown) to change the amount of current applied to the force coil 26, so as to maintain the force between the tip and the sample substantially at the preset value when the tip is rotated further by the sample until the distance that the tip is raised is substantially equal to the threshold value as explained above. The threshold value may be set to a distance of not more than about 500 nanometers. In this manner, the threshold value for determining whether the probe tip has come into contact with the sample surface can be set by setting a value for a corresponding force between the tip and the sample at the DSP 52. Similarly, a threshold value for determining whether the probe tip has come into contact with the sample surface can be set in the case of AFM or other SPM by setting a value for a corresponding force between the tip and the sample at the controller 94.

FIGS. 8A–8C together with their accompanying description below are taken from the parent application.

In order to measure the profile or geometry of a surface, in reference to FIG. 8A, system 20 lifts the probe tip by a predetermined distance h from the surface, record the lateral distance δx traveled by the tip before it is lowered again to touch the surface and record the distance by which the probe tip has been lowered before it touches the surface again. Preferably, the tip is again lifted from such point of contact by the distance h, moved laterally by distance δx, lowered again to touch the surface, and the distance that the tip is lowered again recorded. This process is then repeated until the scan across the target area is completed. A record of such distance δx and the distances that the tip is repeatedly lowered before it touches the surface in the intermittent contact mode throughout the scan will give an indication of the geometry or profile of the surface.

In the embodiment of FIG. 8A, the probe tip is lifted after it is lowered to touch the surface 200, without dragging the probe tip along the surface. In other words, the probe tip is caused to gently tap surface 200 before it is lifted and the probe tip is not moved laterally across the surface while it is in contact with the surface. In some applications, it may be desirable to drag the probe tip along the surface after the tip is lowered to touch the surface, in an embodiment illustrated in FIG. 8B. After the probe tip has been dragged along the surface 200 for a predetermined distance, the probe tip is again lifted by a predetermined distance, such as h, moved laterally by a predetermined distance, and then again lowered to touch the surface 200. After the tip touches the surface, the tip is again dragged along the surface for a predetermined distance and the above-described process repeated until a scan across the entire target area is completed as before. In the operational mode of FIG. 8B, in addition to recording the quantities h, δx, and the distances by which the tip is repeatedly lowered before it touches the surface in the intermittent contact mode throughout the scan, system 20 also records the change in height of the probe tip when the tip is dragged along the surface 200. Such information, in conjunction with h, δx, and the distances by which the tip is lowered before it touches the surface, will give an indication of the geometry or profile of the surface when system 20 is operated in the mode indicated in FIG. 8B.

Yet another operational mode of system 20 in the intermittent contact mode is illustrated in FIG. 8C. Such mode is similar to that in FIG. 8A, where in the operational modes of both FIGS. 8A and 8C, the probe tip is not moved laterally to drag the tip across the surface after the tip is lowered to touch the surface, but is lifted to a predetermined height h. However, instead of moving the probe tip up and down and laterally along substantially straight lines as in FIG. 8A, the tip in FIG. 8C is moved along a more or less sinusoidal path across surface 200 until it scans across the target area. Such and other variations are within the scope of the invention.

Where intermittent contact mode is employed, the values of δx and height h employed in reference to FIGS. 8A–8C are chosen so that it is unlikely for the probe tip to "jump over" bumps or valleys on a surface to be sampled. A suitable range for h may be 10–1,000 Angstroms, and a suitable value for δx may be a fraction of the expected size of the feature or object.

In yet another mode of operation of the apparatuses in FIGS. 2A, 2B, the sensing tip may be scanned across a sample surface with the tip in contact with the surface until the feature is found. Then, the same or a different sensing tip may be used to scan the surface with the tip in intermittent contact with the surface to measure the feature. This is illustrated in FIG. 9A. As shown in FIG. 9A, a scanning probe 300 includes a stylus arm 318 and a sensing tip 320 attached to the stylus arm at or near one end of the arm. At the tip of sensing tip 320 is a flexible sensing tip 322, such as a nanotube. Thus, the spatial relationship between sensing tip 320 and flexible tip 322 is known, so that if a feature of interest is located by means of the sensing tip, the other sensing tip may be accurately positioned above the feature found and used to measure the feature without again having to find the feature. Thus, in one embodiment, arm 318 may be scanned across a sample with sensing tip 320 in contact with the surface to find the feature. After the feature has been found, the flexible tip 322 may be used in an intermittent contact or contact mode to measure the feature. Since the flexible tip in the form of a nanotube is long and thin, it is particularly suitable for measuring high-aspect ratio features. When sensing tip 320 is used to measure or find a feature in a contact mode, the flexible tip simply buckles so that sensing tip 320 may be used during the contact mode scan as if the flexible tip is not present. Nanotubes are very flexible and will not significantly affect the operation of the sensing tip 320 in contact mode. After the feature has been found, sensing tip 320 is withdrawn from the surface so that the flexible tip such as a nanotube will snap back to the original geometry as shown in FIG. 9A and will be in a position to be used for sensing and measuring the feature found.

FIG. 9B illustrates an alternative embodiment to that of FIG. 9A. Instead of mounting two sensing tips on the same common probe, two separate probes 318a and 318b may be used and two different sensing tips 330 and 332 mounted respectively onto probes 318a, 318b may be used where the spatial relationship between the two sensing tips is known. Therefore, one sensing tip, such as sensing tip 330 may be used in a contact or intermittent contact mode to find the feature. Since the spatial relationship between the two tips is known, sensing tip 332 may then be readily positioned accurately above the feature found for measuring the feature in a contact or intermittent contact mode. The roles of the two tips may of course be reversed so that sensing tip 332 may be used for finding the feature and sensing tip 330 may be used for measuring the feature.

While the invention has been described above by reference to various embodiments, it will be understood that changes and modifications may be made without departing from the scope of the invention, which is to be defined only by the appended claims and their equivalents.

What is claimed is:

1. A method for sensing a sample employing a profiler, said profiler having a stylus sensor assembly with an arm rotatable about a pivot and a controller controlling a force acting on the arm, said method comprising the steps of:
   (a) positioning a sensing tip above one location of the sample, wherein the sensing tip is affixed to the arm;
   (b) reducing a distance between the sample and the sensor assembly, without substantially moving the sensor assembly and the sample laterally relative to each other and without substantially rotating the arm about said pivot, until it is shown that the sensing tip has made contact with the sample;
   (c) measuring data related to a height of the sample surface with the tip stationary and in contact with the sample;
   (d) increasing a distance between the sensor assembly and the sample to lift the tip off the sample;
   (e) causing lateral relative motion between the sensing tip and the sample and positioning the tip so that the tip is above a location of the sample adjacent to and spaced apart from said one location; and
   (f) repeating steps (b) through (e) at a plurality of locations of the sample to obtain an image of the sample.

2. The method of claim 1, further comprising a step (b1) of determining whether the tip has made contact with the sample by comparing to a threshold value a distance rotated by the tip about the pivot caused by the sample.

3. The method of claim 2, further comprising setting the threshold value to not more than about 500 nm.

4. The method of claim 1, wherein step (d) increases the distance between the sensor assembly and the sample to a value greater than an expected maximum height variation of the sample surface.

5. The method of claim 2, said method further comprising:
   sensing when a force between the tip and the sample reaches a preset value; and
   maintaining the force between the tip and the sample substantially at said preset value when the tip is rotated by the sample until the distance rotated is substantially equal to said threshold value.

6. The method of claim 5, said profiler comprising at least one moving stage for moving the tip in steps (a), (b), (d), (e), wherein said steps (a), (b), (d), (e) are performed by the at least one stage, further comprising detecting when the distance that the tip is rotated by contact with the sample is substantially equal to said threshold value.

7. The method of claim 6, further comprising causing the moving stage to stop moving the tip when the distance that the tip is rotated by contact with the sample is substantially equal to said threshold value.

8. The method of claim 1, wherein step (e) causes lateral relative motion for a distance in the range of about one nm to fifty mm.

9. The method of claim 1, said profiler comprising at least one moving stage for moving the tip in steps (a), (b), (d), (e), wherein said steps (a), (b), (d), (e) are performed by the at least one stage.

10. The method of claim 9, wherein said steps (a), (b), and (d) are performed without the at least one stage substantially moving the tip and the sample laterally relative to each other.

11. The method of claim 9, said data in step (c) being measured by taking into account a distance moved by the at least one moving stage in step (b) and a distance rotated by the tip about the pivot when the tip touches the sample.

12. The method of claim 1, wherein said arm is constrained to substantially one degree of freedom, so that contact between the tip and the sample in step (b) causes the tip to rotate substantially without twisting.

13. The method of claim 1, wherein said increasing step (d) increases the distance between the sensor assembly and the surface to a constant value before lateral relative motion is caused in step (e).

14. A method for sensing a feature on a surface of a sample employing a sensing tip affixed to a sensor assembly, said method comprising the steps of:
   (a) positioning the sensing tip above one location of the surface;
   (b) reducing a distance between the surface and the sensor assembly without substantially moving the sensor assembly and the surface laterally relative to each other until either the sensing tip or the surface has traveled, or the sensing tip and the surface together have traveled in aggregate, by a preset distance without contacting one another, or only until it is shown that the sensing tip has made contact with the surface;
   (c) increasing a distance between the sensor assembly and the surface without substantially moving the tip and the surface laterally relative to each other until such distance is substantially equal to a predetermined value, said predetermined value being such that after step (c) the tip is higher in elevation than another location of the surface adjacent to and spaced apart from said one location;
   (d) causing lateral relative motion between the sensing tip and the surface and positioning the tip so that the tip is above said another location; and (e) repeating steps (b) through (d) at a plurality of locations of the surface to find or measure the feature.

15. The method of claim 14, further comprising finding said predetermined value so that after step (c) the tip is higher in elevation than another location of the surface adjacent to and spaced apart from said one location.

16. The method of claim 15, wherein said finding step includes providing height information concerning a target area of the sample surface, said target area containing the one and the another location of the surface so that when said distance between the sensor assembly and said surface is increased to said predetermined value in step (c), the tip is at a higher elevation than all locations within the target area of the surface.

17. The method of claim 16, wherein said finding includes measuring data related to the height of the surface at a plurality of sampling locations of the surface within the target area.

18. The method of claim 17, wherein said measuring includes:

(f) positioning the sensing tip above a first sampling location of the surface within the target area;

(g) reducing a distance between the surface and the sensor assembly without substantially moving the sensor assembly and the surface laterally relative to each other until either the sensing tip or the surface has traveled, or the sensing tip and the surface together have traveled in aggregate, by a preset distance without contacting one another, or only until it is shown that the sensing tip has made contact with the surface;

(h) increasing a distance between the sensor assembly and the surface without substantially moving the tip and the surface laterally relative to each other until such distance is substantially equal to a second predetermined value, said second predetermined value being such that after step (h) the tip is higher in elevation than all locations of the surface within the target area;

(i) causing lateral relative motion between the sensing tip and the surface and positioning the tip so that the tip is above another sampling location within the target area of the surface; and (j) repeating steps (g) through (i) at said plurality of sampling locations of the surface within the target area.

19. The method of claim 15, wherein said finding includes measuring data related to the height of the surface at three to twenty-five sampling locations of the surface within the target area.

20. The method of claim 14, wherein said causing step (d) causes lateral relative motion over a distance in the range of about one nm to fifty mm.

21. The method of claim 14, further comprising measuring a height of the surface with the tip stationary and in contact with the surface when it is shown that the tip has made contact with the surface.

22. The method of claim 14, wherein said predetermined value is not more than about one micron.

23. The method of claim 14, said sensing tip being that of a profiler, said profiler having an arm rotatable about a pivot and a controller controlling a force acting on the arm, wherein said steps (a), (b), (c), and (d) are performed without substantially rotating the arm about said pivot unless the tip is in contact with the surface.

24. The method of claim 14, further comprising a step (b1) of determining whether the tip touches the surface by comparing to a threshold value a distance moved by the tip caused by the surface.

25. The method of claim 24, further comprising setting the threshold value to not more than about 500 nm.

26. The method of claim 24, said method further comprising:

sensing when a force between the tip and the sample reaches a preset value; and maintaining the force between the tip and the sample substantially at said preset value when the tip is moved by the sample until the distance moved is substantially equal to said threshold value.

27. The method of claim 26, said profiler comprising a controller controlling a force exerted by the tip against the surface, wherein said controller is used to perform the force sensing and maintenance.

28. The method of claim 14, said method employing at least one moving stage for moving the tip in steps (b), (c), (d), wherein said steps (b), (c), (d) are performed by the at least one stage.

29. The method of claim 28, wherein said steps (a), (b), and (c) are performed without the at least one stage substantially moving the tip and the sample laterally relative to each other.

30. The method of claim 29, further comprising measuring data related to height of the surface, said data being measured by taking into account a distance moved by the at least one moving stage in step (b) and a distance moved by the tip relative to the stage caused by contact with the sample.

31. A method for sensing a feature on a surface of a sample employing a sensing tip, said method comprising the steps of:

(a) positioning the sensing tip above one location of the surface;

(b) reducing a distance between the surface and a sensing tip without substantially moving the tip and the surface laterally relative to each other until either the tip or the surface has traveled, or the tip and the surface together have traveled in aggregate, by a preset distance without contacting the surface, or until the tip touches the surface;

(c) increasing a distance between the tip and the surface without substantially moving the tip and the surface laterally relative to each other until such distance is substantially equal to a predetermined value, said predetermined value being such that after step (c) the tip is higher in elevation than another location of the surface adjacent to and spaced apart from said one location;

(d) causing lateral relative motion between the sensing tip and the surface and positioning the tip so that the tip is above said another location;

(e) repeating steps (b) through (d) at a plurality of locations of the surface to find or measure the feature; and (f) finding said predetermined value so that after step (c) the tip is higher in elevation than another location of the surface adjacent to and spaced apart from said one location, wherein said finding includes measuring data related to height of the surface prior to step (c) and predicting from such data an elevation of said another location.

32. The method of claim 31, wherein said predicting includes curve fitting said data related to heights of the surface at a plurality of locations and extrapolation.

33. The method of claim 31, wherein said sample surface is inclined and wherein said predicting includes estimating a slope of the sample surface.

34. A method for sensing a feature on a surface of a sample employing a sensing tip, said method comprising the steps of:
- (a) positioning the sensing tip above one location of the surface;
- (b) reducing a distance between the surface and a sensing tip without substantially moving the tip and the surface laterally relative to each other until either the tip or the surface has traveled, or the tip and the surface together have traveled in aggregate, by a preset distance without contacting the surface, or until the tip touches the surface;
- (c) increasing a distance between the tip and the surface without substantially moving the tip and the surface laterally relative to each other until such distance is substantially equal to a predetermined value, said predetermined value being such that after step (c) the tip is higher in elevation than another location of the surface adjacent to and spaced apart from said one location;
- (d) causing lateral relative motion between the sensing tip and the surface and positioning the tip so that the tip is above said another location; and
- (e) repeating steps (b) through (d) at a plurality of locations of the surface to find or measure the feature;
- wherein the feature is found in step (b) or step (e) when either the tip or the surface has traveled, or the tip and the surface together have traveled in aggregate, by said preset distance without contacting the surface.

35. The method of claim 34, wherein after the feature is found, step (b) is repeated in step (e) by reducing a distance between the surface and a sensing tip until the tip touches the surface, said method further comprising measuring data related to a height of the feature with the tip stationary and in contact with the surface when the tip touches the surface to obtain a profile or an image of the feature.

36. A method for sensing a feature on a surface of a sample employing a sensing tip, said method comprising the steps of:
- (a) positioning the sensing tip above one location of the surface;
- (b) reducing a distance between the surface and a sensing tip without substantially moving the tip and the surface laterally relative to each other until either the tip or the surface has traveled, or the tip and the surface together have traveled in aggregate, by a preset distance without contacting the surface, or until the tip touches the surface;
- (c) increasing a distance between the tip and the surface without substantially moving the tip and the surface laterally relative to each other until such distance is substantially equal to a predetermined value, said predetermined value being such that after step (c) the tip is higher in elevation than another location of the surface adjacent to and spaced apart from said one location;
- (d) causing lateral relative motion between the sensing tip and the surface and positioning the tip so that the tip is above said another location; and
- (e) repeating steps (b) through (d) at a plurality of locations of the surface to find or measure the feature;
- wherein when the tip touches the surface in step (b), in the immediately following step (c), the distance between the tip and the surface is increased by a first predetermined value, and wherein when the tip does not touch the surface in step (b), in the immediately following step (c), the distance between the tip and the surface is increased by a second predetermined value.

37. The method of claim 36, wherein said second predetermined value is substantially equal to said preset distance.

38. The method of claim 36, wherein said second predetermined value is larger than the first predetermined value.

39. A method for sensing a feature on a surface of a sample employing a sensing tip, said method comprising the steps of:
- (a) positioning the sensing tip above one location of the surface;
- (b) reducing a distance between the surface and a sensing tip without substantially moving the tip and the surface laterally relative to each other until either the tip or the surface has traveled, or the tip and the surface together have traveled in aggregate, by a preset distance without contacting the surface, or until the tip touches the surface;
- (c) increasing a distance between the tip and the surface without substantially moving the tip and the surface laterally relative to each other until such distance is substantially equal to a predetermined value, said predetermined value being such that after step (c) the tip is higher in elevation than another location of the surface adjacent to and spaced apart from said one location;
- (d) causing lateral relative motion between the sensing tip and the surface and positioning the tip so that the tip is above said another location; and
- (e) repeating steps (b) through (d) at a plurality of locations of the surface to find or measure the feature;
- wherein a target area of the sample surface has substantially two discrete heights, with portions of the surface in the target area at a lower first height and portions at a higher second height, and wherein step (a) positions the sensing tip above one location at the second height.

40. The method of claim 39, wherein step (b) reduces the distance between the surface and a sensing tip until the tip touches the surface at the first or the second height in the target area.

41. A method for sensing a high aspect ratio feature on a surface of a sample employing a sensing tip, said method comprising the steps of:
- scanning the sensing tip across the surface; and
- controlling a distance between the surface and the tip so that the tip contacts the surface intermittently, without substantially moving the tip and the surface laterally relative to each other when the tip and surface are in contact, wherein the tip does not penetrate said feature when scanning across the surface.

42. The method of claim 41, wherein said controlling includes reducing a distance between the surface and the sensing tip without substantially moving the tip and the surface laterally relative to each other until either the tip or the surface has traveled, or the tip and the surface together have traveled in aggregate, by a preset distance without contacting the surface or until the tip touches the surface.

43. The method of claim 42, further comprising measuring a height of the surface with the tip held in contact with the surface when the tip touches the surface.

44. The method of claim 43, further comprising, after the reducing:
- increasing a distance between the sensing tip and the sample without substantially moving the tip and the surface laterally relative to each other; and causing lateral relative motion between the sensing tip and the surface.

45. The method of claim 41, wherein said controlling causes the distance between the surface and the tip to increase to values not more than about one micron.

46. The method of claim 41, said sensing tip being that of a profiler, said profiler having an arm rotatable about a pivot and a controller controlling a force acting on the arm, wherein said scanning and controlling steps are performed without substantially rotating the arm about said pivot unless the tip is in contact with the surface.

47. The method of claim 46 further comprising determining whether the tip touches the surface by comparing to a threshold value a distance moved by the tip about the pivot caused by the surface.

48. The method of claim 47, further comprising setting the threshold value to not more than about 500 nm.

49. The method of claim 47, said method further comprising:
sensing when a force between the tip and the sample reaches a preset value; and
maintaining the force between the tip and the sample substantially at said preset value when the tip is moved by the sample until the distance moved is substantially equal to said threshold value.

50. The method of claim 41, said method further comprising positioning the tip above a location of the surface so that the tip will not come into lateral contact with the surface.

51. The method of claim 50, wherein said positioning includes providing height information concerning the surface.

52. The method of claim 51, wherein said providing includes measuring the height of the surface at sampling locations of the surface in a dipping mode.

53. A method for sensing a high aspect ratio feature on a surface of a sample employing a sensing tip, said method comprising the steps of:
scanning the sensing tip across the surface; and
controlling a distance between the surface and the tip so that the tip contacts the surface intermittently, without substantially moving the tip and the surface laterally relative to each other when the tip and surface are in contact, wherein the tip does not penetrate said feature when scanning across the surface;
wherein said controlling includes reducing a distance between the surface and the sensing tip without substantially moving the tip and the surface laterally relative to each other until either the tip or the surface has traveled, or the tip and the surface together have traveled in aggregate, by a preset distance without contacting the surface or until the tip touches the surface; and
wherein the feature is found when either the tip or the surface has traveled, or the tip and the surface together have traveled in aggregate, by said preset distance without contacting the surface.

54. The method of claim 53, further comprising, after the feature is found, measuring data related to a height of the feature with the tip stationary and in contact with the surface when the tip touches the surface to obtain a profile or an image of the feature.

55. A method for sensing a high aspect ratio feature on a sloping surface of a sample employing a sensing tip, said method comprising the steps of:
scanning the sensing tip across the surface;
controlling a distance between the surface and the tip so that the tip contacts the surface intermittently, without substantially moving the tip and the surface laterally relative to each other when the tip and surface are in contact, wherein the tip does not penetrate said feature when scanning across the surface;
wherein said controlling includes reducing a distance between the surface and the sensing tip without substantially moving the tip and the surface laterally relative to each other until either the tip or the surface has traveled, or the tip and the surface together have traveled in aggregate, by a preset distance without contacting the surface or until the tip touches the surface;
measuring a height of the surface at each instance when the tip touches the surface, with the tip held in contact with the surface, wherein said measuring measures data related to height of the surface at a plurality of locations of the surface;
after each reducing, increasing a distance between the sensing tip and the sample without substantially moving the tip and the surface laterally relative to each other;
after each increasing, causing lateral relative motion between the sensing tip and the surface;
predicting a slope of the sample surface from said data; and
determining the distance that is increased so that the sensing tip will not contact the surface laterally during the lateral relative motion.

56. A method for sensing a surface of a sample employing a probe with a sensing tip, said method comprising the steps of:
(a) positioning the sensing tip above one location of the surface of the sample;
(b) reducing a distance between the surface and a sensing tip without substantially moving the tip and the surface laterally relative to each other until the tip touches the surface;
(c) measuring data related to a height of the sample surface with the tip in contact with the sample at a contact point;
(d) increasing a distance between the tip and the contact point of the surface without substantially moving the tip and the surface laterally relative to each other until such distance is substantially equal to a predetermined value;
(e) causing lateral relative motion between the sensing tip and the surface and positioning the tip so that the tip is above a location adjacent to and spaced apart from said one location; and
(f) repeating steps (b) through (e) at a plurality of locations of the surface to obtain an image of the surface;
said method further comprising step (e1) of determining whether the tip and the surface are in contact during step (d), wherein steps (b) through (e) are repeated in step (f) only after a determination that the tip and the surface are not in contact.

57. The method of claim 56, wherein step (a) positions the sensing tip without adequate prior information concerning extent of height variations of the surface to avoid lateral contact between the tip and the surface when the tip is scanned across the surface, and said lateral relative motion in step (e) is over a lateral distance less than about 100 nm.

58. The method of claim 57, further comprising step (e2) of increasing a distance between the tip and the sample without substantially moving the tip and the sample laterally relative to each other until such distance is substantially equal to the predetermined value when said determining step (e1) determines that the tip and the surface are in contact after step (d).

59. The method of claim 58, further comprising repeating steps (e1), (e2) until said determining step determines that the tip and surface are not in contact, wherein steps (b) through (e) are then repeated in step (f).

60. The method of claim 58, further comprising discarding the data measured when the tip remains in contact with the surface after step (d) and during steps (e1) and (e2).

61. The method of claim 56, wherein the sensing tip is that of a probe of a profiler or scanning probe microscope, step (e1) determines whether the tip and the surface are in contact by:
  causing the probe to approach the surface; and
  sensing whether the tip rises as soon as the probe is caused to approach the surface or whether the tip has moved by a threshold distance when the probe is caused to approach the surface.

62. The method of claim 61, further comprising setting the threshold value to not more than about 500 nm.

63. The method of claim 61, said probe being that of a profiler, said method further comprising:
  sensing when a force between the tip and the sample reaches a preset value; and
  maintaining the force between the tip and the sample substantially at said preset value when the tip is rotated by the sample about a pivot of the profiler until the distance rotated is substantially equal to said threshold value.

64. The method of claim 56, wherein said measuring measures data related to a height of the sample surface with the tip stationary and in contact with the sample at the contact point.

65. A method for sensing a high aspect ratio feature on a surface of a sample employing a sensing tip of a profiler or scanning probe microscope, said method comprising the steps of:
  providing height information of the surface within a target area of the surface;
  positioning the tip above one location of the surface in the target area using such information;
  scanning the sensing tip across the surface; and
  controlling a distance between the surface and the tip using said information during the scanning so that the tip contacts the surface intermittently and so that the tip does not contact the surface laterally when the tip is scanned across the surface; wherein said controlling controls said distance so that the tip is scanned without substantially moving the tip and the surface laterally relative to each other when the tip and surface are in contact, wherein the tip does not penetrate said feature when scanning across the surface.

66. The method of claim 65, wherein said tip contacts the surface at a sequence of locations, wherein said providing includes measuring data related to the height of the surface at at least one location within a target area of the surface when the tip is in contact with the surface, and wherein said controlling controls the distance using said data so that the tip is raised to an elevation higher than the subsequent location of the surface in the target area in the sequence.

67. The method of claim 66, wherein said providing includes measuring data related to the height of the surface at a plurality of sampling locations within the target area of the surface.

68. The method of claim 67, wherein said measuring includes:
  (a) positioning the sensing tip above a first sampling location of the surface in the target area of the surface;
  (b) reducing a distance between the surface and a sensing tip without substantially moving the tip and the surface laterally relative to each other until either the tip or the surface has traveled, or the tip and the surface together have traveled in aggregate, by a preset distance without contacting the surface, or until the tip touches the surface;
  (c) increasing a distance between the tip and the surface without substantially moving the tip and the surface laterally relative to each other until such distance is substantially equal to a second predetermined value, said second predetermined value being such that after step (c) the tip is higher in elevation than all locations of the surface within the target area;
  (d) causing lateral relative motion between the sensing tip and the surface and positioning the tip so that the tip is above another sampling location in the target area; and
  (e) repeating steps (b) through (d) at said plurality of sampling locations of the surface in the target area.

69. A method for sensing a high aspect ratio feature on a surface of a sample employing a sensing tip of a profiler or scanning probe microscope, said method comprising the steps of:
  providing height information of the surface within a target area of the surface, wherein said providing includes measuring data related to the height of the surface at a plurality of sampling locations within the target area of the surface when the tip is in contact with the surface;
  positioning the tip above one location of the surface in the target area using such information;
  scanning the sensing tip across the surface, wherein said tip contacts the surface at a sequence of locations;
  controlling a distance between the surface and the tip using said information during the scanning so that the tip contacts the surface intermittently and so that the tip does not contact the surface laterally when the tip is scanned across the surface, wherein said controlling controls the distance using said data so that the tip is raised to an elevation higher than the subsequent location of the surface in the target area in the sequence, and wherein said controlling includes predicting from such data an elevation of the subsequent location of the surface in the target area in the sequence.

70. The method of claim 69, wherein said predicting includes curve fitting such data and extrapolation.

71. An apparatus for sensing a sample, comprising:
  a sensor assembly for sensing the sample, said assembly including a base portion and a movable portion, said movable portion including a sensing tip connected to the base portion, wherein a force applied to the tip caused by contact between the tip and the sample may cause the tip to move relative to the base portion;
  one or more moving stages causing a vertical relative motion between the assembly and the sample, thereby changing a distance between the assembly and the sample; and
  a measurement controller configured to measure the vertical relative motion between the assembly and the sample, and to compute a change in the distance between the sensing tip and the sample caused by a combination of the relative motion between the tip and the base portion of the sensor assembly and said vertical relative motion.

72. The apparatus of claim 71, said assembly comprising an arm rotatable about a pivot, said arm having a sensing tip, and a sensor sensing distance rotated by said sensing tip about the pivot; wherein the measurement controller computes a change in the distance between the sensing tip and the sample caused by a combination of the rotation of the tip about the pivot and said vertical motion.

73. The apparatus of claim 72, further comprising a feedback path between the sensor and the moving stages, said path transmitting a signal representative of the distance moved by the tip caused by the surface, said one or more moving stages controlling the vertical motion in response to said signal.

74. The apparatus of claim 73, said moving stage(s) having a motion controller controlling the vertical motion in response to the signal.

75. The apparatus of claim 74, wherein said motion controller causes the moving stage(s) to stop causing vertical motion between the profiler and the sample when the tip has moved by a distance substantially equal to a threshold value.

76. The apparatus of claim 72, further comprising a force controller controlling a force acting on the sensor assembly so that a preset force is applied by the tip to the sample when the tip is caused to move by the surface.

* * * * *